(12) United States Patent
Farha et al.

(10) Patent No.: US 12,102,991 B2
(45) Date of Patent: Oct. 1, 2024

(54) LIGAND-DIRECTED RETICULAR SYNTHESIS OF METAL-ORGANIC FRAMEWORKS HAVING EDGE-TRANSITIVE ALB NETWORK TOPOLOGIES

(71) Applicant: Northwestern University, Evanston, IL (US)

(72) Inventors: Omar K. Farha, Glenview, IL (US); Zhijie Chen, Evanston, IL (US); Penghao Li, Evanston, IL (US); J. Fraser Stoddart, Evanston, IL (US)

(73) Assignee: Northwestern University, Evanston, IL (US)

( * ) Notice: Subject to any disclaimer, the term of this patent is extended or adjusted under 35 U.S.C. 154(b) by 375 days.

(21) Appl. No.: 17/626,791

(22) PCT Filed: Jul. 16, 2020

(86) PCT No.: PCT/US2020/042271
§ 371 (c)(1),
(2) Date: Jan. 12, 2022

(87) PCT Pub. No.: WO2021/011740
PCT Pub. Date: Jan. 21, 2021

(65) Prior Publication Data
US 2022/0297100 A1    Sep. 22, 2022

Related U.S. Application Data

(60) Provisional application No. 62/875,115, filed on Jul. 17, 2019.

(51) Int. Cl.
*B01J 31/16* (2006.01)

(52) U.S. Cl.
CPC ........ *B01J 31/1691* (2013.01); *B01J 2531/38* (2013.01); *B01J 2531/39* (2013.01); *B01J 2531/48* (2013.01); *B01J 2531/49* (2013.01)

(58) Field of Classification Search
None
See application file for complete search history.

(56) References Cited

U.S. PATENT DOCUMENTS

| | | |
|---|---|---|
| 8,530,719 B1 | 9/2013 | Peterson et al. |
| 2015/0328490 A1 | 11/2015 | McDaniel |

(Continued)

FOREIGN PATENT DOCUMENTS

WO    WO 2021/113296    6/2021

OTHER PUBLICATIONS

Joseph E. Mondloch et al., "Destruction of chemical warfare agents using metal-organic frameworks," *Nature Letters*, Advance Online Publication, Published online: Mar. 16, 2015; pp. 1-5. DOI:10.1038/NMAT4238.

(Continued)

*Primary Examiner* — Yun Qian
(74) *Attorney, Agent, or Firm* — Bell & Manning, LLC

(57) ABSTRACT

A series of isoreticular metal-organic frameworks composed of metal nodes connected by rigid trigonal prismatic organic linkers and having a 6,12-coordinatled alb network topology are provided. Also provided are methods of synthesizing the metal-organic frameworks and methods of using the metal-organic frameworks to catalyze the hydrolysis of organic molecules, such as nerve agents, having hydrolysable bonds.

17 Claims, 31 Drawing Sheets

(56) References Cited

U.S. PATENT DOCUMENTS

2017/0096394 A1 4/2017 Eddaoudi et al.
2017/0128761 A1 5/2017 Hupp et al.

OTHER PUBLICATIONS

D. Banerjee et al., "Potential of Metal-Organic Frameworks for Separation of Xenon and Krypton," *Accounts of Chemical Research*, vol. 48, No. 2; pp. 211-219. https://doi.org/10.1021/ar5003126.
Olaf Delgado-Friedrichs et al., "Three-periodic nets and tilings: edge-transitive binodal structures," *Acta Cryst.* (2006), vol. A62; pp.: 350-355. doi:10.1107/S0108767306022707.
Tian-Fu Liu et al., "Adding to the Arsenal of Zirconium-Based Metal-Organic Frameworks: the Topology as a Platform for Solvent-Assisted Metal Incorporation," *Eur. J. Inorg. Chem.* 0000, 0-0; pp. 1-5. DOI: 10.1002/ejic.201600627.
Dawei Feng et al., "A Highly Stable Porphyrinic Zirconium Metal-Organic Framework with shp-a Topology," *Journal of the American Chemical Society* 2014, vol. 136; pp. 17714-17717. dx.doi.org/10.1021/ja510525s.
Zhijie Chen et al., "Toward base heterogenization: A zirconium metal-organic framework/dendrimer or polymer mixture for rapid hydrolysis of a nerve-agent simulant." *ACS Applied Nano Materials* 2.2 (2019): 1005-1008.
Chen, Zhijie, et al. "Applying the power of reticular chemistry to finding the missing alb-MOF platform based on the (6, 12)-coordinated edge-transitive net." *Journal of the American Chemical Society* 139.8 Feb. 5, 2017; 3265-3274.
Chen, Zhijie, et al. "Reticular access to highly porous acs-MOFs with rigid trigonal prismatic linkers for water sorption." *Journal of the American Chemical Society* 141.7 (2019): 2900-2905.
Wang, Bin, et al. "Highly stable Zr (IV)-based metal-organic frameworks for the detection and removal of antibiotics and organic explosives in water." *Journal of the American Chemical Society* 138.19 (2016): 6204-6216.
Chen, Zhijie, et al. "Minimal edge-transitive nets for the design and construction of metal-organic frameworks." *Faraday Discussions* 201 (2017): 127-143.
Lyu, Jiafei, et al. "Topology and porosity control of metal-organic frameworks through linker functionalization." *Chemical science* 10.4 (2019): 1186-1192.
Li, Penghao, et al. "Interpenetration Isomerism in Triptycene-Based Hydrogen-Bonded Organic Frameworks." *Angewandte Chemie* 131.6 (2019): 1678-1683.
Decoste, Jared B., and Gregory W. Peterson. "Metal-organic frameworks for air purification of toxic chemicals." *Chemical reviews* 114.11 (2014): 5695-5727.
Palomba, Joseph M., et al. "High-throughput screening of solid-state catalysts for nerve agent degradation." *Chemical Communications* 54.45 (2018): 5768-5771.
Gil-San-Millan, Rodrigo, et al. "Chemical warfare agents detoxification properties of zirconium metal-organic frameworks by synergistic incorporation of nucleophilic and basic sites." *ACS Applied Materials & Interfaces* 9.28 (2017): 23967-23973.
Peng Li et al., "Synthesis of nanocrystals of Zr-based metal-organic frameworks with csq-net: significant enhancement in the degradation of a nerve agent simulant," *Chem. Commun.*, 2015, 51, 10925-10928.
The International Search Report and the Written Opinion issued Nov. 24, 2020 for international patent application No. PCT/US20/42271; pp. 1-10.
Joseph E. Mondloch et al., "Destruction of chemical warfare agents using metal-organic frameworks," *Nature Materials*, vol. 14, Mar. 16, 2015; pp. 512-516.
Michael J. Katz et al., "Simple and Compelling Biomimetic Metal-Organic Framework Catalyst for the Degradation of Nerve Agent Simulants," *Angew. Chem. Int. Ed.* 2014, 53, 497-501.
Su-Young Moon et al., "Instantaneous Hydrolysis of Nerve-Agent Simulants with a Six-Connected Zirconium-Based Metal-Organic Framework," *Angew. Chem. Int. Ed.* 2015, 54, 6795-6799.
Junjie Zhao et al., "Ultra-Fast Degradation of Chemical Warfare Agents Using MOF-Nanofiber Kebabs," *Angew. Chem. Int. Ed.* 2016, 55, 1-6.
Annie Xi Lu et al., "MOFabric: Electrospun Nanofiber Mats from PVDF/UiO-66-NH2 for Chemical Protection and Decontamination," *ACS Applied Materials & Interfaces* XXXX, XXX, XXX-XXX. pp. A-E. DOI: 10.1021/acsami.7b01621.
Hiroyasu Furukawa et al., "Water Adsorption in Porous Metal-Organic Frameworks and Related Materials," *Journal of the American Chemical Society* 2014, 136, 4369-4381. dx.doi.org/10.1021/ja500330a.
Moon, Su-Young, et al. "Detoxification of Chemical Warfare Agents Using a Zr6-Based Metal-Organic Framework/Polymer Mixture." *Chemistry—A European Journal* 22.42 (2016): 14864-14868.
Zhijie Chen et al., Supporting Information for "Toward base heterogenization: A zirconium metal-organic framework/dendrimer or polymer mixture for rapid hydrolysis of a nerve-agent simulant." ACS Applied Nano Materials 2.2 (2019): S-1 to S-10.
Chen, Haoyuan, et al. "Insights into Catalytic Hydrolysis of Organophosphate Warfare Agents by Metal-Organic Framework NU-1000." *The Journal of Physical Chemistry C* 122.23 (2018): 12362-12368.
Chen, Zhijie, et al. "Ligand-Directed Reticular Synthesis of Catalytically Active Missing Zirconium-Based Metal-Organic Frameworks." *Journal of the American Chemical Society* 141.31 (2019): 12229-12235.
De Koning, Martijn C., Marco van Grol, and Troy Breijaert. "Degradation of Paraoxon and the Chemical Warfare Agents VX, Tabun, and Soman by the Metal-Organic Frameworks UiO-66-NH2, MOF-808, NU-1000, and PCN-777." *Inorganic chemistry* 56.19 (2017): 11804-11809.
López-Maya, Elena, et al. "Textile/Metal-Organic-Framework Composites as Self-Detoxifying Filters for Chemical-Warfare Agents." *Angewandte Chemie International Edition* 54.23 (2015): 6790-6794.
Momeni, Mohammad R., and Christopher J. Cramer. "Dual Role of Water in Heterogeneous Catalytic Hydrolysis of Sarin by Zirconium-Based Metal-Organic Frameworks." *ACS Applied Materials & Interfaces* 10.22 (2018): 18435-18439.
Park, Hea Jung, et al. "Synthesis of a Zr-Based Metal-Organic Framework with Spirobifluorenetetrabenzoic Acid for the Effective Removal of Nerve Agent Simulants." *Inorganic Chemistry* 56.20 (2017): 12098-12101.
Rose, Marcus, et al. "MOF processing by electrospinning for functional textiles." *Advanced Engineering Materials* 13.4 (2011): 356-360.
Wang, Hui, et al. "Solid-Phase Detoxification of Chemical Warfare Agents using Zirconium-based Metal Organic Frameworks and the Moisture Effects-Analyze via Digestion." *ACS applied materials & interfaces* (2019).
Zhang, Yuanyuan, et al. "Preparation of nanofibrous metal-organic framework filters for efficient air pollution control." *Journal of the American Chemical Society* 138.18 (2016): 5785-5788.
Timur Islamoglu et al., "Presence vs. proximity: the role of pendant amines in the catalytic hydrolysis of a nerve agent simulant," Communication Wiley-VCH; pp. 1-5.
Chen, Zhijie, et al. "Integration of metal-organic frameworks on protective layers for destruction of nerve agents under relevant conditions." *Journal of the American Chemical Society* 141.51 (2019): 20016-20021.
Liu, Yangyang, et al. "Catalytic degradation of chemical warfare agents and their simulants by metal-organic frameworks." *Coordination Chemistry Reviews* 346 (2017): 101-111.
Kim, Self-Exfoliating and Reactive Polymer (SERP) as A Protection Against Chemical Warfare Agents (CWAs); Doctoral Dissertation, University of Massachusetts Amherst, Department of Polymer Science and Engineering (Sep. 2019), p. ix-xv and p. 1-93 9 the entire document, and more specifically: p. 7, para 1; para 1; p. 39; para 2; p. 40, para 1; p. 41, para1; p. 62, para 1; p. 85, para 1; abstract).

(56) References Cited

OTHER PUBLICATIONS

Kim et al., "Zirconium Hydroxide-coated Nanofiber Mats for Nerve Agent Decontamination;" *Chemistry an Asian Journal*, vol. 12, Issue 6 (Mar. 2017), p. 698-705.

LIGAND-DIRECTED RETICULAR SYNTHESIS OF METAL-ORGANIC FRAMEWORKS HAVING EDGE-TRANSITIVE ALB NETWORK TOPOLOGIES

CROSS-REFERENCE TO RELATED APPLICATIONS

This application is a National Stage of International Application No. PCT/US20/42271, filed Jul. 16, 2020, which claims the priority benefit of United States Provisional Patent Application No. 62/875,115, filed Jul. 17, 2019, the contents of which are herein incorporated by reference.

REFERENCE TO GOVERNMENT RIGHTS

This invention was made with government support under HDTRA-18-1-0003 and HDTRA-19-1-0007 awarded by the Defense Threat Reduction Agency (DTRA). The government has certain rights in the invention.

BACKGROUND

Metal-organic frameworks (MOFs), which are composed of inorganic nodes and organic linkers, are a class of porous, crystalline materials with a wide range of applications including, but not limited to, heterogeneous catalysis, selective sensing, gas storage and separation. Reticular chemistry permits the rational top-down design and precise assembly of MOFs at the molecular level from diverse inorganic and organic building units. Consequently, MOFs have highly programmable structures with tunable pore sizes and apertures, high surface areas, and diverse functionalities.

Zirconium-based MOFs (Zr-MOFs) represent a remarkable MOF subclass on account of their strong Zr-O coordination bonds, and have received considerable attention in the field since the first Zr-MOF—i.e., UiO-66 with the 12-connected (12-c) fcu topology where UiO denotes University of Oslo—was reported with $Zr_6$ inorganic building blocks. (Cavka, J. H. et al.; *J. Am. Chem. Soc.* 2008, 130, 13850-13851.) Tremendous efforts have been devoted to the development of Zr-MOFs based on edge-transitive nets—i.e., one type of edge—because of the upsurge in reticular chemistry and versatile connectivity of polynuclear Zr clusters. Many applications of these Zr-MOFs have been investigated, from heterogeneous catalysis to water capture. These edge-transitive networks include spn (e.g., MOF-808; triangle and trigonal antiprism), she (e.g., PCN-224; square and hexagon), hxg (e.g., pbz-MOF-1; hexagon), the (e.g., NU-1200/BUT-12; triangle and cube), csq (e.g., PCN-222/MOF-545 and NU-1000; square and cube), flu (e.g., PCN-521; tetrahedron and cube), reo (e.g., DUT-51; cube); ftw (e.g., MOF-525 and MOF-1211; square and cuboctahedron), ith (e.g., MOF-812; tetrahedron and icosahedron), and shp (e.g., PCN-223; square and hexagonal prism). The structures of these Zr-MOFs are provided in Table 1, below, and in FIGS. 1A-1II.

TABLE 1

| OF | Net (rcsr code) | Connectivity | Organic linker | Linker connectivity and shape | Cluster connectivity and shape | Ref. |
|---|---|---|---|---|---|---|
| NU-1600 | alb | 6, 12-c | FIG. 1A | 6-c, trigonal prism | 12-c, hexagonal prism (disordered) | this work |
| NU-1601 | alb | 6, 12-c | FIG. 1B | 6-c, trigonal prism | 12-c, hexagonal prism (disordered) | this work |
| NU-1602 | alb | 6, 12-c | FIG. 1C | 6-c, trigonal prism | 12-c, hexagonal prism (disordered) | this work |
| MOF-525 | ftw | 4, 12-c | FIG. 1D | 4, square | 12-c, cuboctahedron | 1 |
| MOF-1211 (Zr/Co) | ftw | 4, 12-c | FIG. 1E | 4, square (metallorganic ligand) | 12-c, cuboctahedron | 2 |
| MOF-812 | ith | 4, 12-c | FIG. 1F | 4-c, tetrahedron | 12-c, icosahedron | 3 |
| PCN-223 | shp | 4, 12-c | FIG. 1G | 4-c, square | 12-c, hexagonal prism (disordered) | 4 |
| NU-904 | shp | 4, 12-c | FIG. 1H | 4-c, square | 12-c, hexagonal prism (disordered) | 5 |
| UiO-66 | fcu | 12-c | FIG. 1I | 2-c, linear | 12-c, cuboctahedron | 6 |
| MOF-801 | fcu | 12-c | FIG. 1J | 2-c, linear | 12-c, cuboctahedron | 7-8 |
| UiO-67 | fcu | 12-c | FIG. 1K | 2-c, linear | 12-c, cuboctahedron | 6 |
| MOF-1212 (Zr/Cu) | fcu | 12-c | FIG. 1L | 2-c, linear, (metallorganic ligand) | 12-c, cuboctahedron | 2 |
| PCN-700 | bcu | 8-c | FIG. 1M | 2-c, twisted | 8-c, cube | 9 |

TABLE 1-continued

| OF | Net (rcsr code) | Connectivity | Organic linker | Linker connectivity and shape | Cluster connectivity and shape | Ref. |
|---|---|---|---|---|---|---|
| Zr-bcu-22bipy44dc | bcu | 8-c | FIG. 1N | 2-c, zigzag | 8-c, cube | 10 |
| DUT-51 | reo | 8-c | FIG. 1O | 2-c, bent | 8-c, cube | 11 |
| MOF-841 | flu | 4, 8-c | FIG. 1P | 4-c, tetrahedron | 8-c, cube | 3 |
| PCN-521 | flu | 4, 8-c | FIG. 1Q | 4-c, tetrahedron | 8-c, cube | 12 |
| UMCM-312 | flu | 4, 8-c | FIG. 1R | 4-c, tetrahedron | 8-c, cube | 13 |
| PCN-225 | sqc | 4, 8-c | FIG. 1S | 4-c, square | 8-c, cube | 14 |
| NU-901 | scu | 4, 8-c | FIG. 1T | 4-c, rectangle | 8-c, cube | 15 |
| NU-902 | scu | 4, 8-c | FIG. 1U | 4-c, square | 8-c, cube | 16 |
| NU-903 | scu | 4, 8-c | FIG. 1V | 4-c, rectangle | 8-c, cube | 5 |
| PCN-222/ MOF-545/ MMPF-6 | csq | 4, 8-c | FIG. 1W | 4-c, square | 8-c, cube | 1, 17-18 |
| NU-1000 | csq | 4, 8-c | FIG. 1X | 4-c, rectangle | 8-c, cube | 19 |
| UMCM-313 | csq | 4, 8-c | FIG. 1Y | 4-c, rectangle | 8-c, cube | 13 |
| NU-1200/ BUT-12 | the | 3, 8-c | FIG. 1Z | 3-c, triangular | 8-c, cube | 20-21 |
| pbz-MOF-1 | hxg | 6-c | FIG. 1AA | 6-c, hexagon | 6-c, hexagon | 22 |
| BUT-66 | pcu-c | 6-c | FIG. 1BB | 2-c, bent | 6-c, octahedron | 23 |
| Zr-cal MOF | gar | 4, 6-c | FIG. 1CC | 4-c, tetrahedron | 6-c, octahedron | 24 |
| PCN-224 | she | 4, 6-c | FIG. 1DD | 4-c, square | 6-c, hexagon | 25 |
| MOF-892 | stp | 4, 6-c | FIG. 1EE | 4-c, rectangle | 6-c, trigonal prism | 26 |
| MOF-808 | spn | 3, 6-c | FIG. 1FF | 3-c, triangular | 6-c, trigonal antiprism | 3 |
| PCN-777 | spn | 3, 6-c | FIG. 1GG | 3-c, triangular | 6-c, trigonal antiprism | 27 |
| Zr-TPTC-(Me)$_2$ | lvt | 4-c | FIG. 1HH | 4-c, rectangle | 4-c, rectangle | 28 |
| NU-1400 | lvt | 4-c | FIG 1II | 4-c, rectangle | 4-c, rectangle | 29 |

The references recited in Table 1 are as follows: Ref 1—Morris, W. et al., *Inorg. Chem.* 2012, 51, 6443-6445; Ref 2—Muldoon, P. F. et al., *J. Am. Chem. Soc.* 2018, 140, 6194-6198; Ref 3—Peterson, G. W. et al., *J. Porous Mater.* 2014, 21, 121-126; Ref 4—Feng, D. et al., *J. Am. Chem. Soc.* 2014, 136, 17714-17717; Ref 5—Lyu, J. et al., *Chem. Sci.* 2019, 10, 1186-1192; Ref 6—Cavka, J. H. et al., *J. Am. Chem. Soc.* 2008, 130, 13850-13851; Ref 7—Wißmann, G. et al., *Microporous Mesoporous Mater.* 2012, 152, 64-70; Ref 8—Furukawa, H. et al., *J. Am. Chem. Soc.* 2014, 136, 4369-4381; Ref 9—Yuan, S. et al., *J. Am. Chem. Soc.* 2015, 137, 3177-3180; Ref 10—Guillerm, V. et al., *J. Am Chem Soc* 2018, 140, 10153-10157; Ref 11—Bon, V. et al., *Chem. Commun.* 2012, 48, 8407-8409; Ref 12—Zhang, M. et al., *Angew. Chem. Int. Ed.* 2013, 53, 815-818; Ref 13—Ma, J. et al., *Cryst. Growth Des.* 2016, 16, 4148-4153; Ref 14—Jiang, H.-L. et al., *J. Am. Chem. Soc.* 2013, 135, 13934-13938; Ref 15—Kung, C.-W. et al., *Chem. Mater.* 2013, 25, 5012-5017; Ref 16—Deria, P. et al., *J. Am. Chem. Soc.* 2016, 138, 14449-14457; Ref 17—Feng, D. et al., *Angew. Chem. Int. Ed.* 2012, 51, 10307-10310; Ref 18—Chen, Y. et al., *Inorg. Chem.* 2012, 51, 12600-12602; Ref 19—Mondloch, J. E. et al., *J. Am. Chem. Soc.* 2013, 135, 10294-10297; Ref 20—Liu, T.-F. et al., *Eur. J Inorg. Chem.* 2016, 2016, 4349-4352; Ref 21—Wang, B. et al., *J. Am. Chem. Soc.* 2016, 138, 6204-6216; Ref 22—Alezi, D. et al., *J. Am. Chem. Soc.* 2016, 138, 12767-12770; Ref 23—Xie, L.-H. et al., *Chem* 2018, 4, 1911-1927; Ref 24—Schulz, M. et al., *Angew. Chem. Int. Ed.* 2018, 0; Ref 25—Feng, D. et al., *J. Am. Chem. Soc.* 2013, 135, 17105-17110; Ref 26—Nguyen, P. T. K. et al., *ACS Appl. Mater. Interfaces* 2018, 10, 733-744; Ref 27 -Feng, D. et al., Angew. Chem. Int. Ed. 2015, 54, 149-154; Ref 28—Wang, H. et al., *Nat. Commun* 2018, 9, 1745; Ref 29—Zhang, Y. et al., *J. Am. Chem. Soc.* 2018, 140, 11179-11183.

SUMMARY

A series of isoreticular MOFs composed of metal nodes connected by rigid trigonal prismatic organic linkers and having an edge-transitive 6, 12-coordinated alb network topology (6,12-c alb net MOFs) are provided. Also provided are methods of synthesizing the MOFs and methods of using the MOFs to catalyze the hydrolysis of organic molecules. The isoreticular series of the MOFs can be formed by ligand-directed reticular syntheses.

One example of a metal-organic framework having a 6,12-coordinated alb network topology has $M_6$ nodes connected by organic linkers, where M is a metal and the organic linkers comprise extended triptycene groups.

One example of a method of making a metal-organic framework having a 6,12-coordinated alb network topology with $M_6$ nodes connected by organic linkers, where M is a metal and the organic linkers comprise extended triptycene groups, includes the steps of: dissolving a metal salt, at least one peripherally extended triptycene ligand, and an acid in a solvent to form a solution; and heating the solution to induce crystallization of the metal-organic framework from the metal salt and the peripherally extended triptycene ligand.

One example of a method of hydrolyzing a molecule having a hydrolysable bond is carried out by exposing the molecule having the hydrolysable bond to a metal-organic framework having a 6,12-coordinated alb network topology in the presence of water, the metal-organic framework having $M_6$ nodes connected by organic linkers, where M is a metal, the $M_6$ nodes have Lewis acidic sites, and the organic linkers comprise extended triptycene groups, wherein the metal-organic framework catalyzes the hydrolysis of the hydrolysable bond.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

A series of isoreticular MOFs composed of metal nodes connected by rigid trigonal prismatic organic linkers and having an edge-transitive alb network topology are provided. Also provided are methods of synthesizing the MOFs and methods of using the MOFs to catalyze the hydrolysis of organic molecules, such as nerve agents, having hydrolysable bonds.

MOFs are hybrid, crystalline, porous compounds made from metal-ligand networks that include inorganic nodes connected by coordination bonds to organic linkers. The inorganic nodes (also referred to as vertices) in the framework include metal ions or metal atoms clusters. (By convention, carboxylates or other linker terminal groups or atoms are often represented as components of the nodes.) By way of illustration, in some MOFs, the inorganic nodes may have six metal atoms. Such nodes are generally designated $M_6$ nodes; for example, a node with six zirconium atoms would be designated a $Zr_6$ node and, because the node is a zirconium node, the MOF would be designated a Zr-MOF.

In various embodiments of the MOFs, the trigonal prismatic structure of the organic linkers is provided by peripherally extended triptycene groups in the chains of the organic linkers. As shown below, an organic linker having peripherally extended triptycene groups is one that includes a central triptycene unit which is extended at its periphery by substituents at the $R_1$ positions, where $R_1$ is an organic group comprisng aryl groups, alkyl groups, or a combination thereof. By way of illustration, in some embodiments the $R_1$ groups in the linkers include phenyl groups, biphenyl groups, and/or tolane groups.

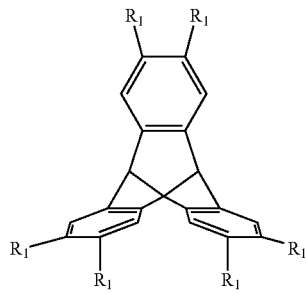

Isoreticular MOFs are MOFs having the same network topology. Thus, the isoreticular MOFs described herein have the same 6,12-coordinated alb network topology, but different pore volumes, pore sizes, and/or surface areas, which can be controlled by the selection of the extended triptycene ligands that are used to synthesize the MOF. By way of illustration, the MOFs may be microporous or mesoporous and may have pore volumes in the range from 0.5 to 2.5 $cm^3/g$ and/or Brunauer-Emmett-Teller (BET) surface areas in the range from 2000 $m^2/g$ to 5000 $m^2/g$.

Figure 1A:
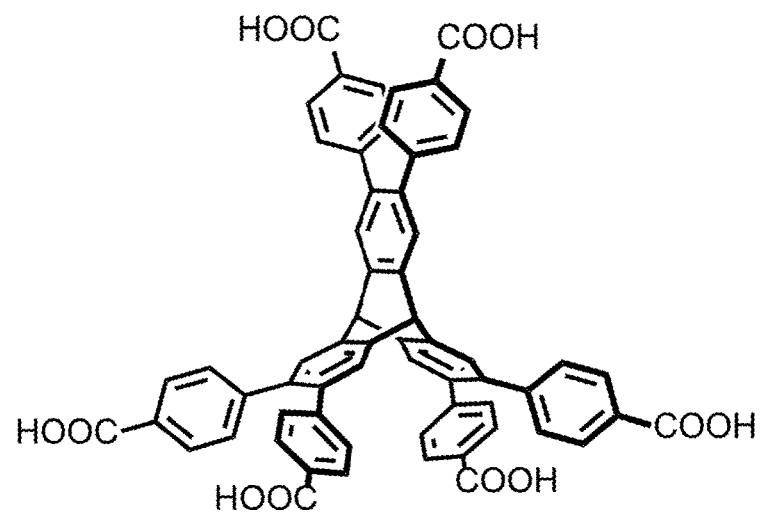
FIGS. 1A-1II shows various Zr-MOFs based on edge-transitive nets (connectivity from high to low).
Figure 1B:
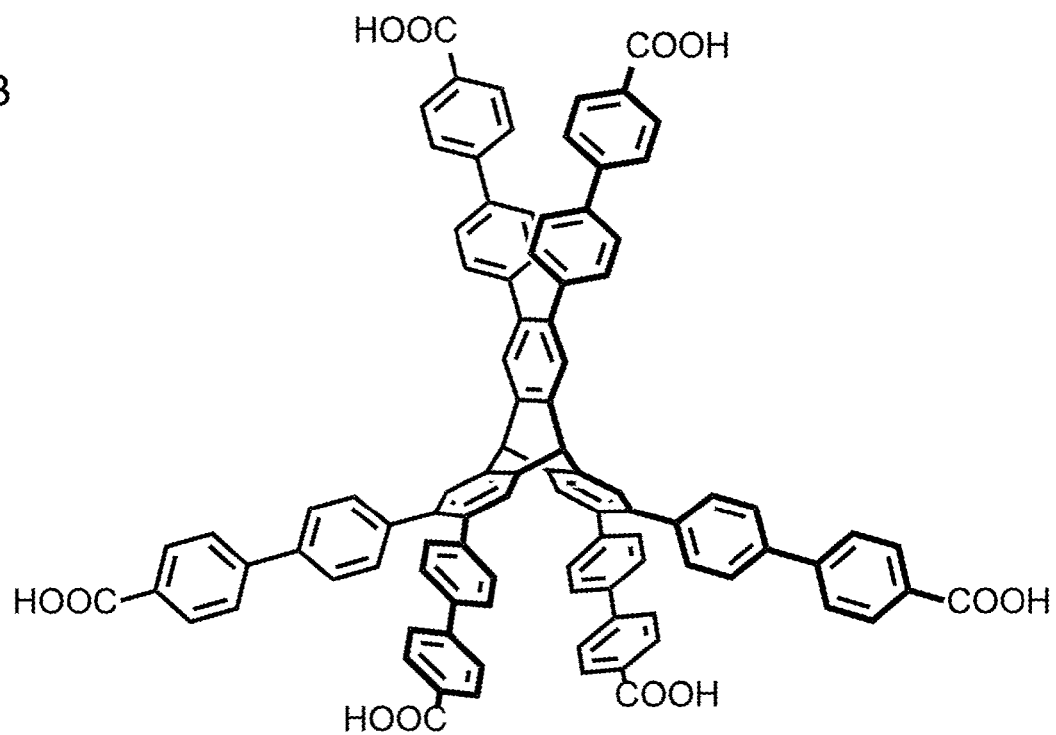
Figure 1C:
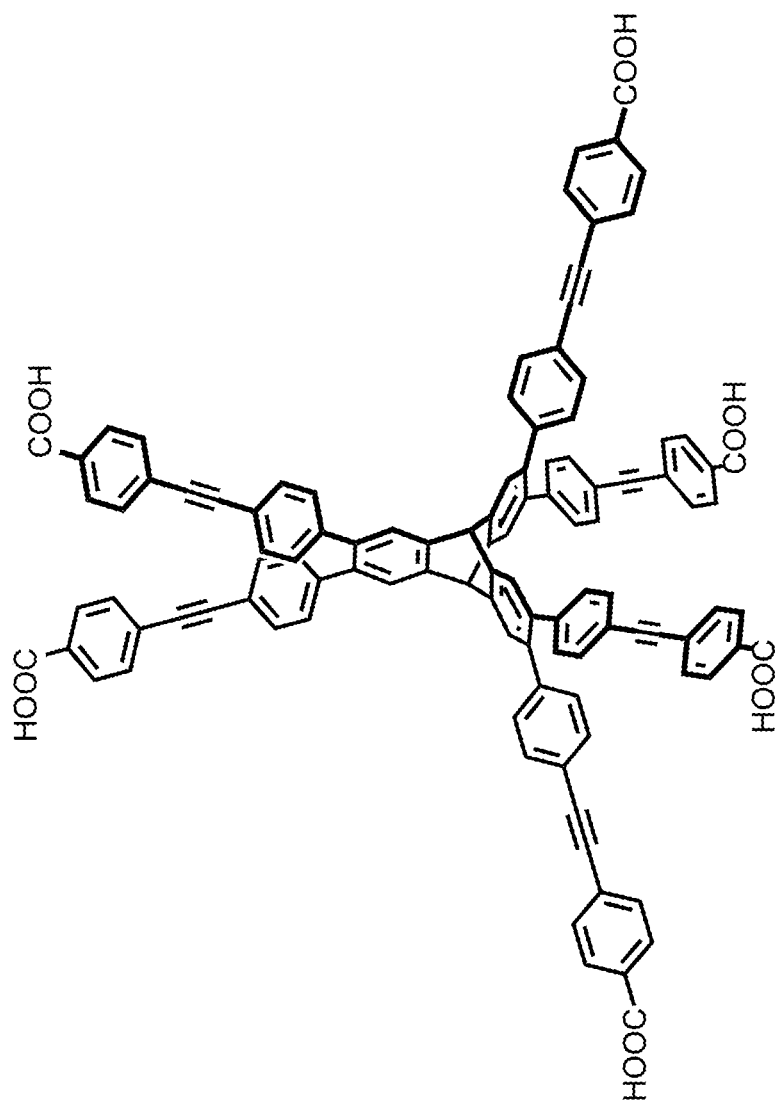
Figure 1D:
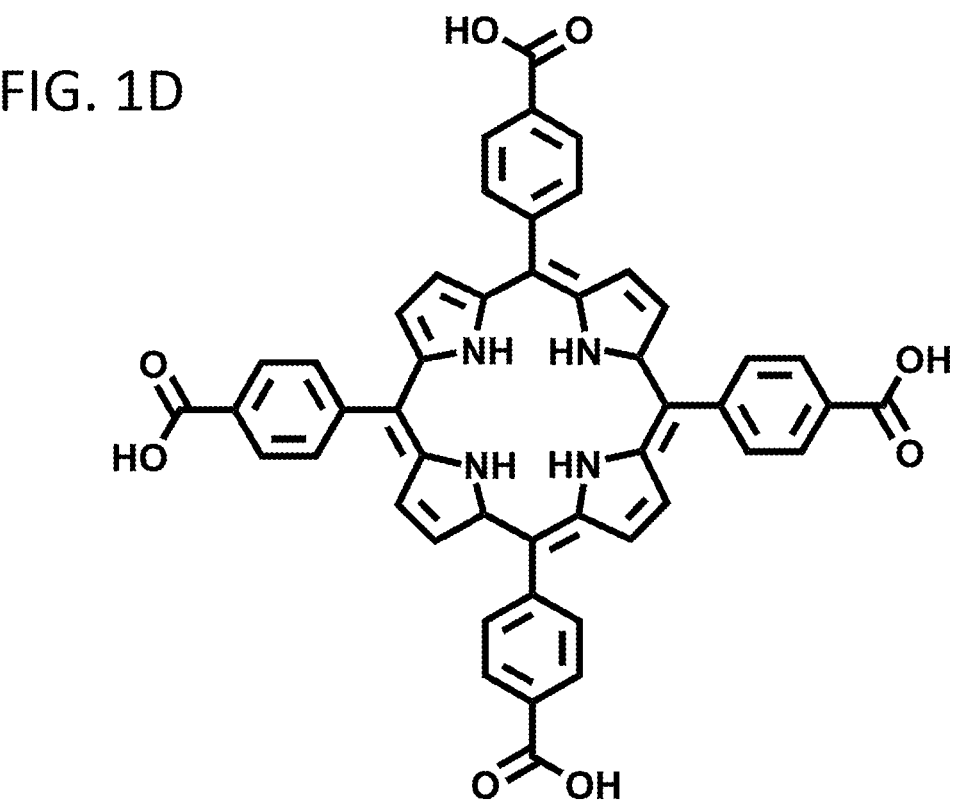
Figure 1E:
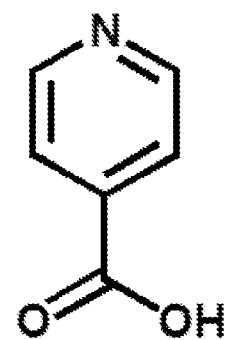
Figure 1G:
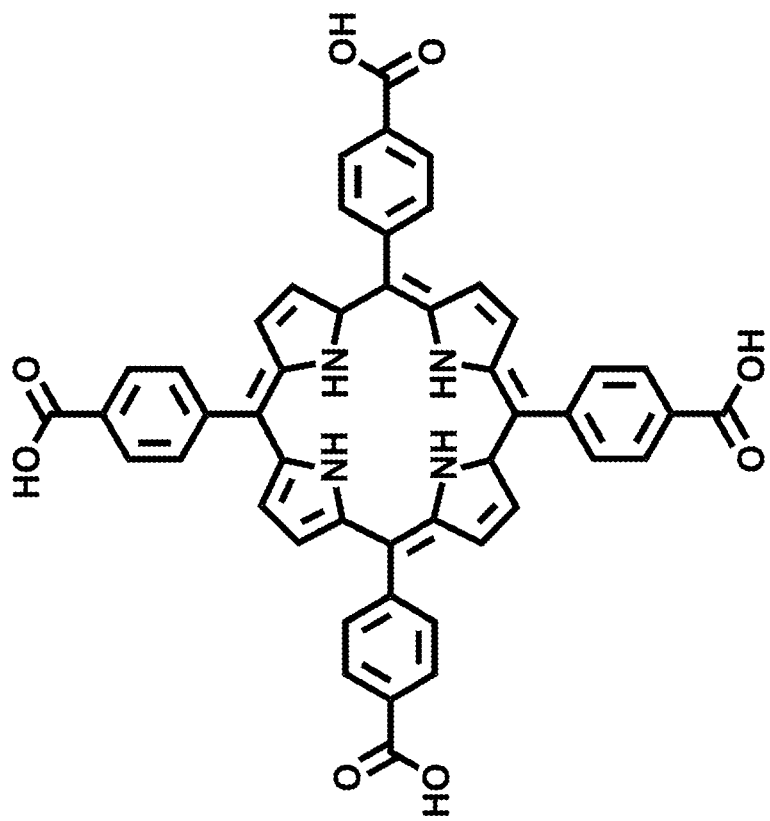
Figure 1F:
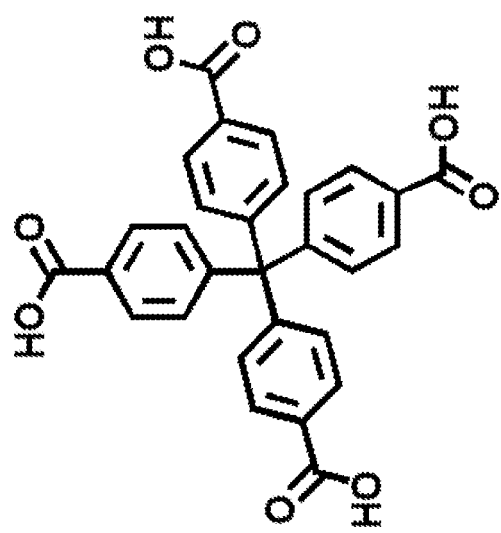
Figure 1I:
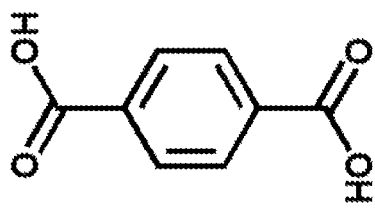
Figure 1K:
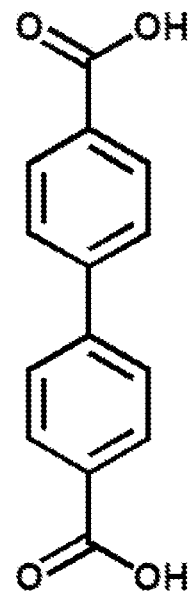
Figure 1H:
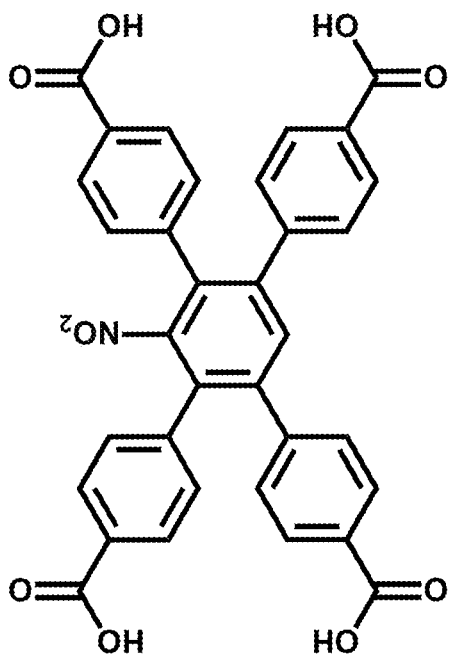
Figure 1J:
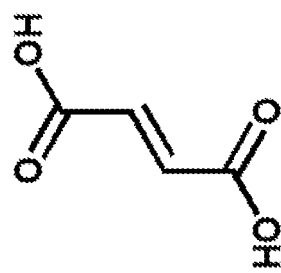
Figure 1N:
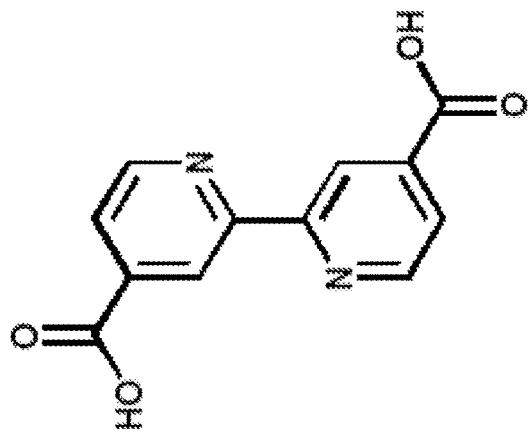
Figure 1P:
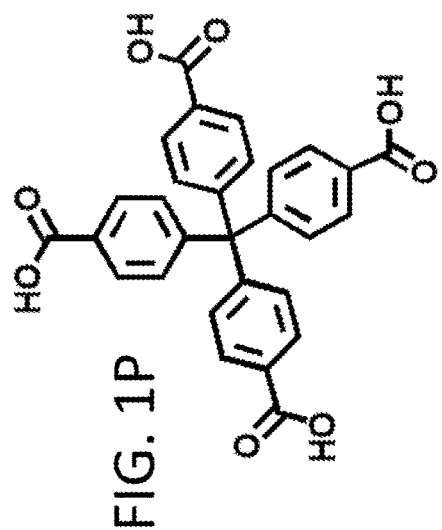
Figure 1M:
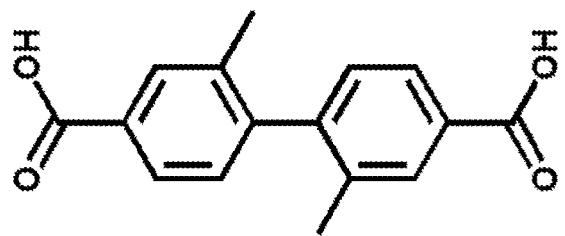
Figure 1L:
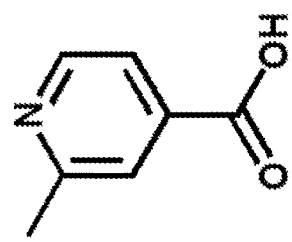
Figure 1O:
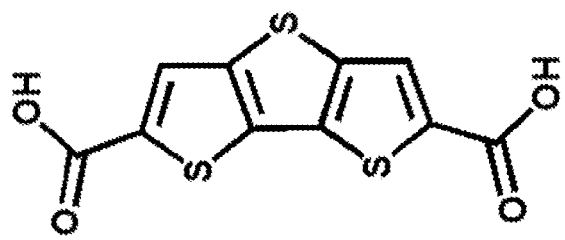
Figure 1R:
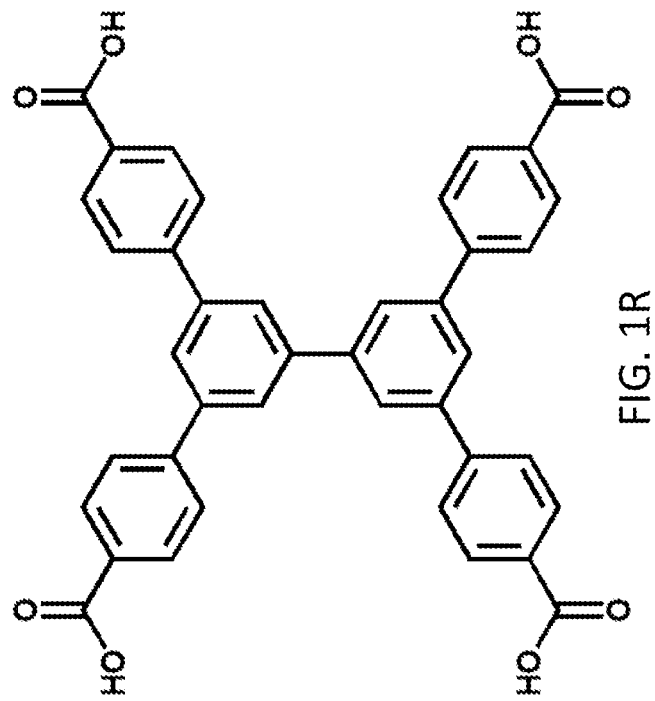
Figure 1Q:
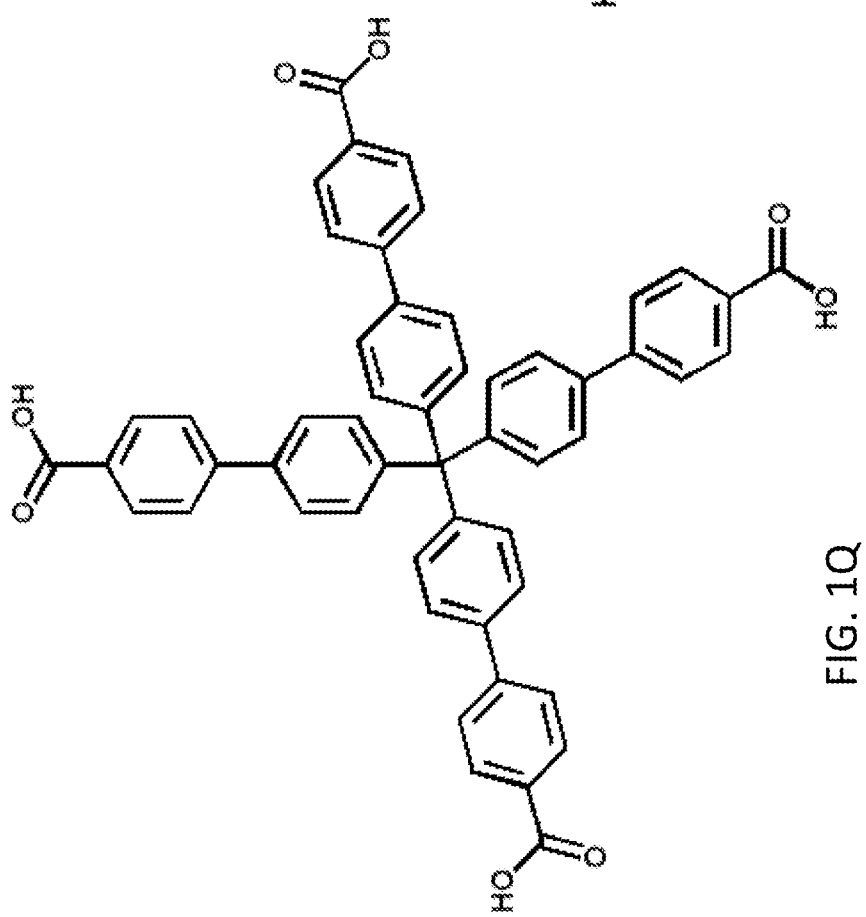
Figure 1T:
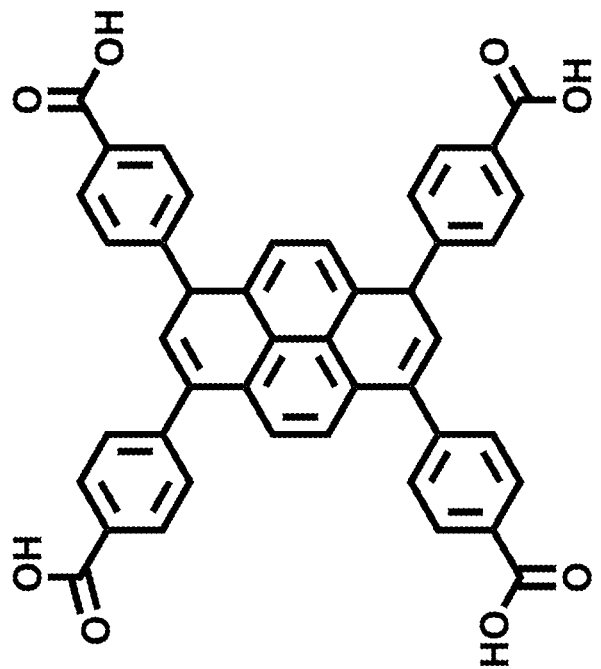
Figure 1S:
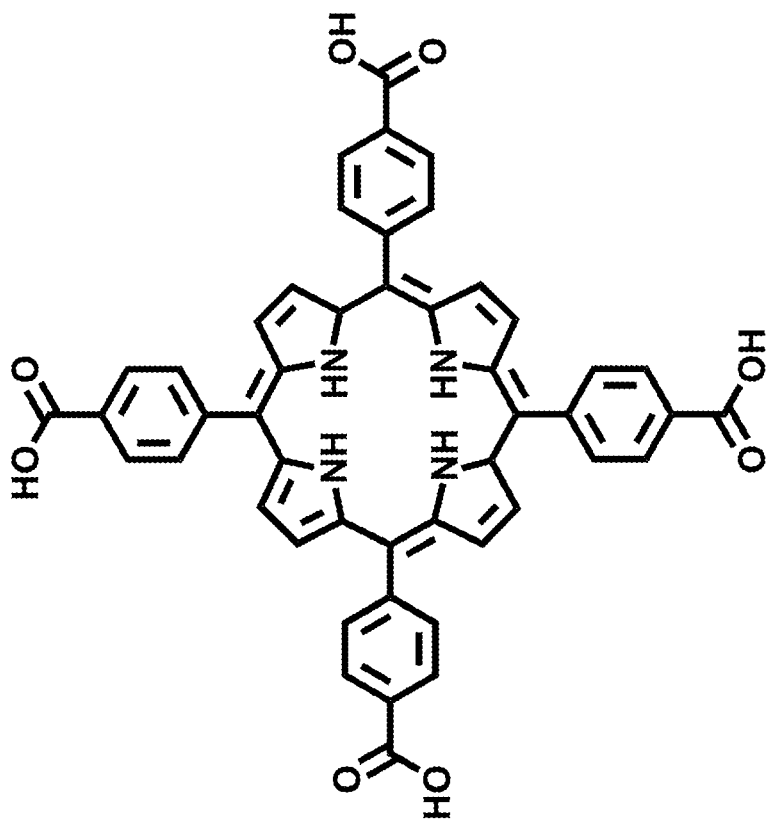
Figure 1V:
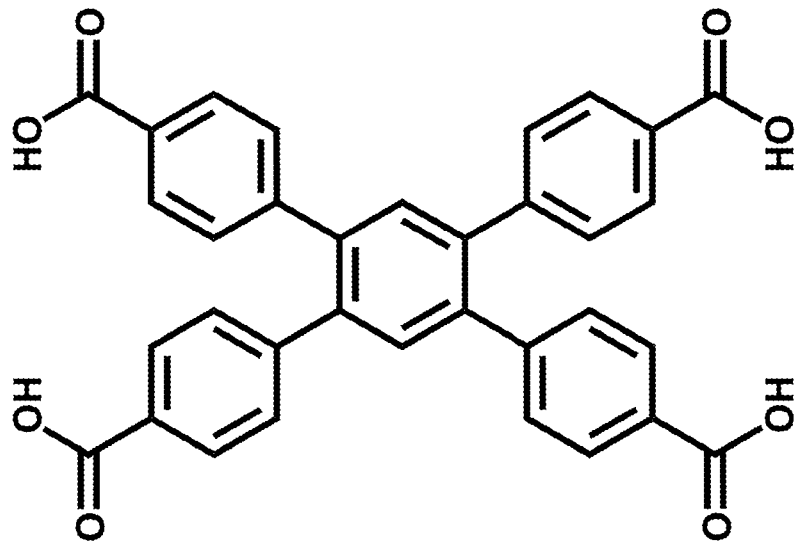
Figure 1U:
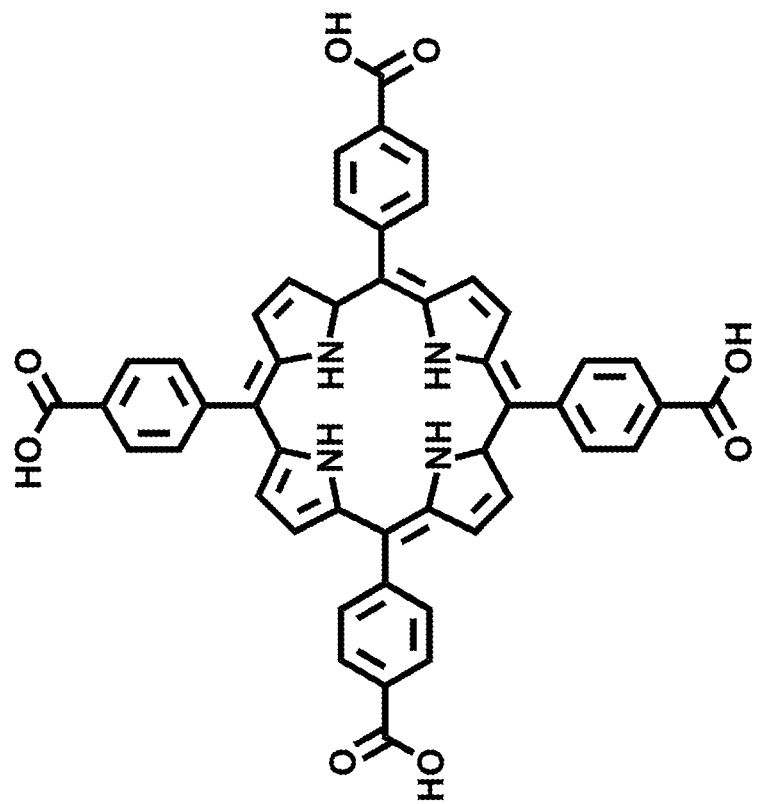
Figure 1X:
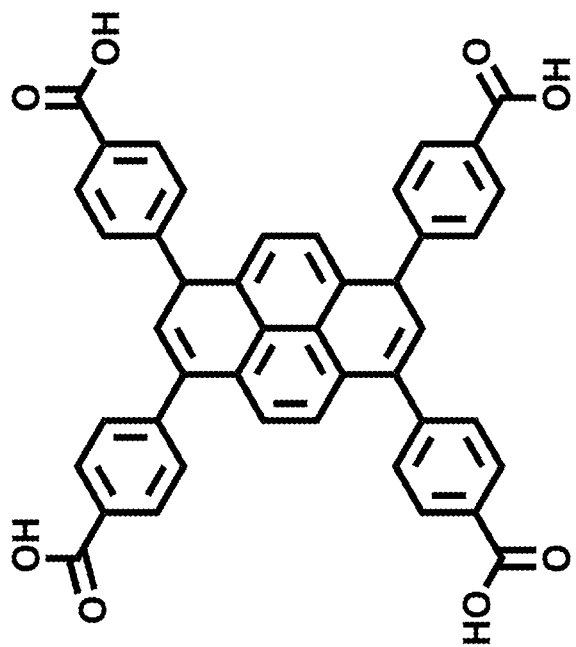
Figure 1W:
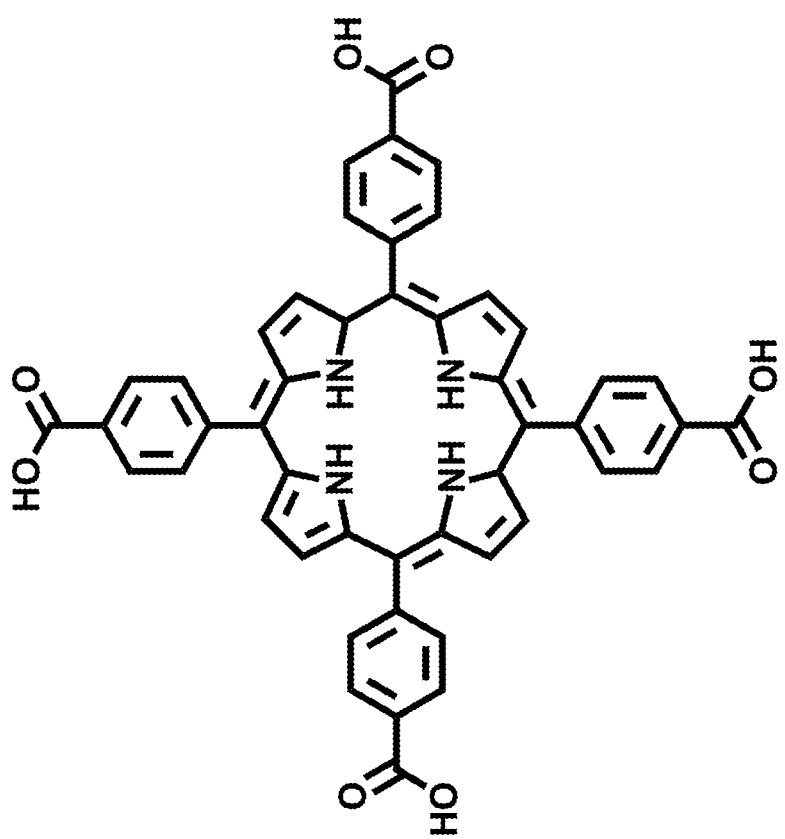
Figures 1Y, 1Z:
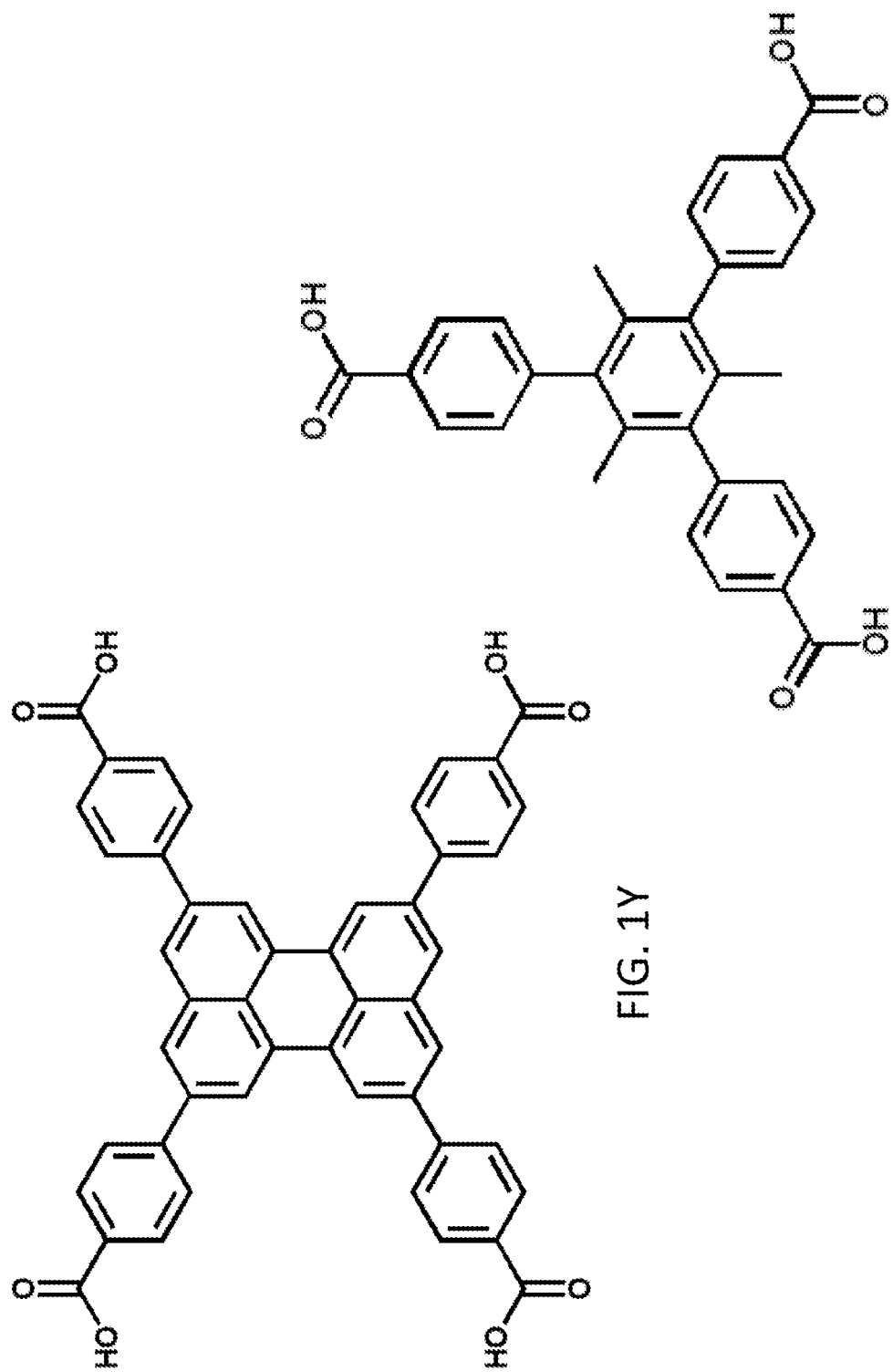
Figure 1A:
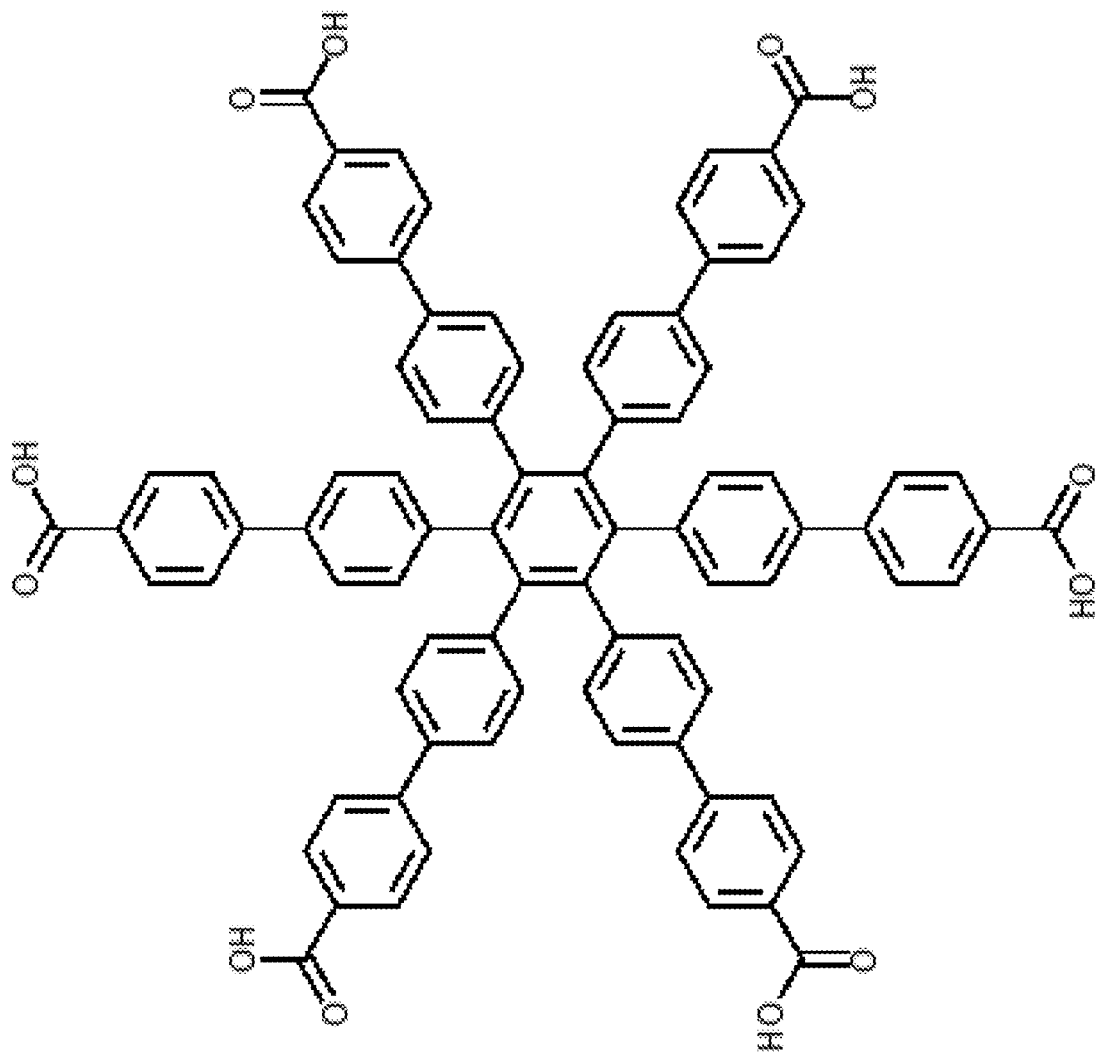
Figure 1C:
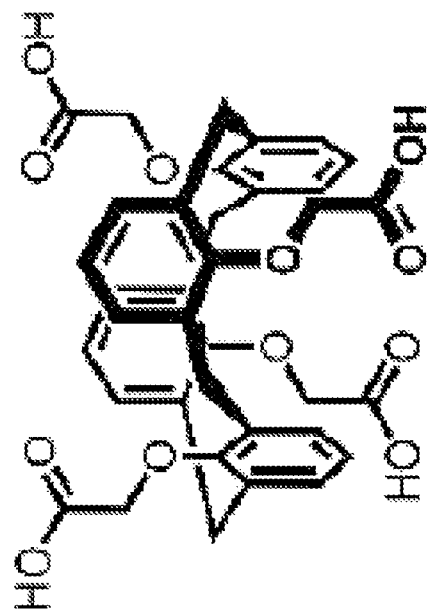
Figure 1B:
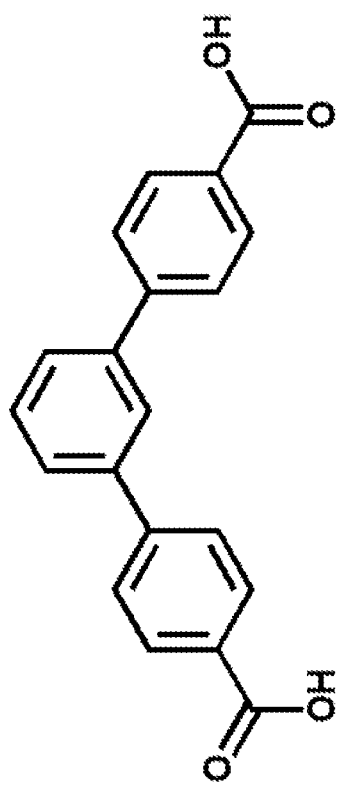
Figure 1E:
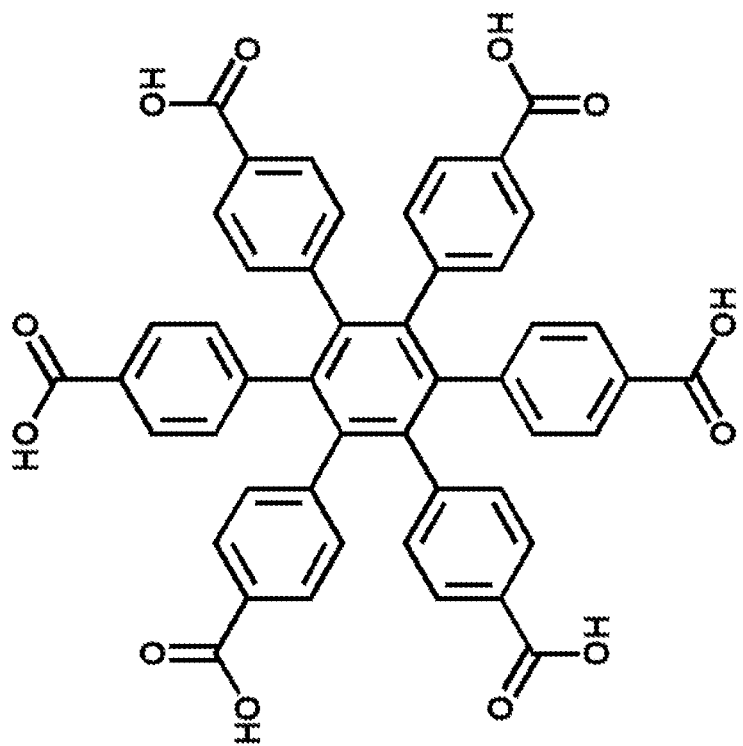
Figure 1D:
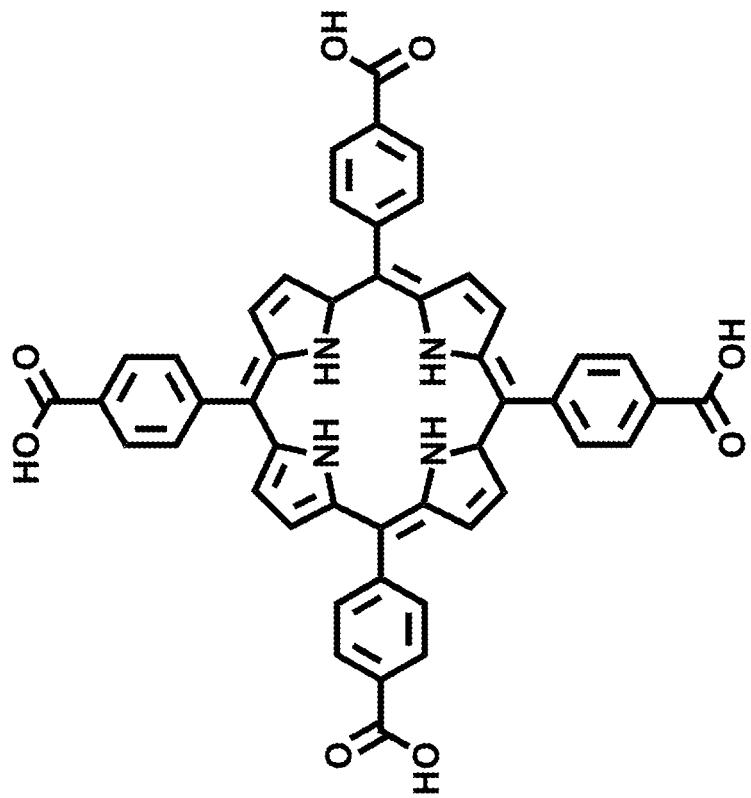
Figure 1G:
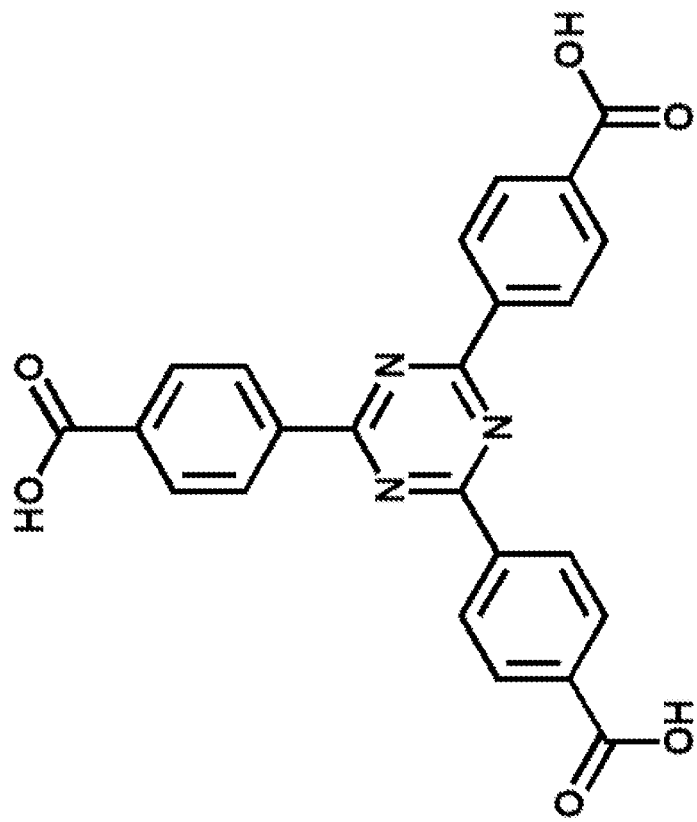
Figure 1F:
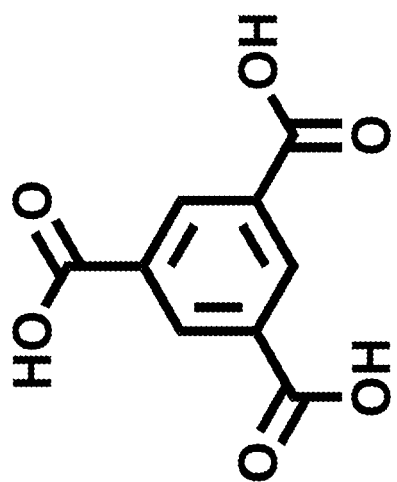
Figure 1I:
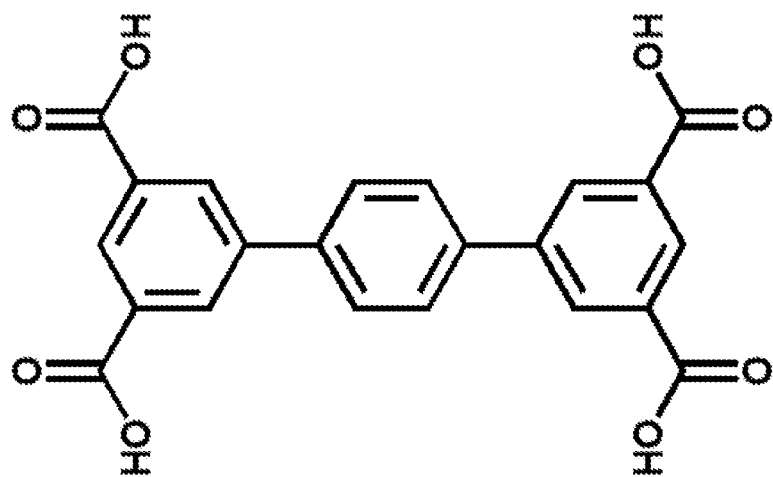
Figure 1H:
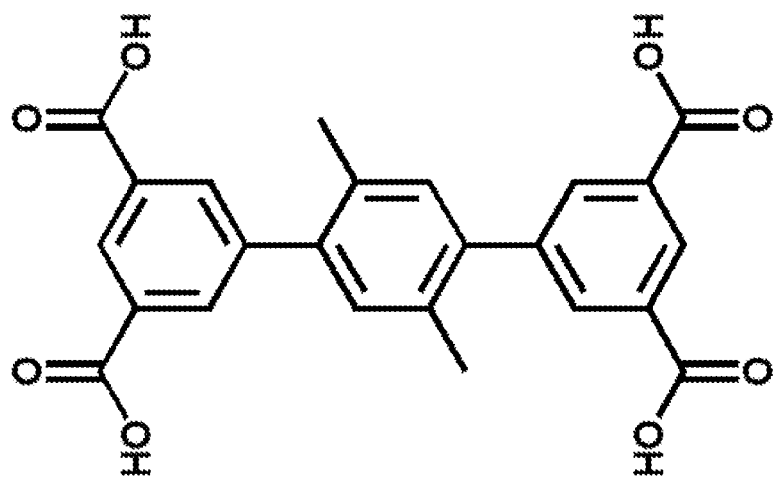
Figure 2A:
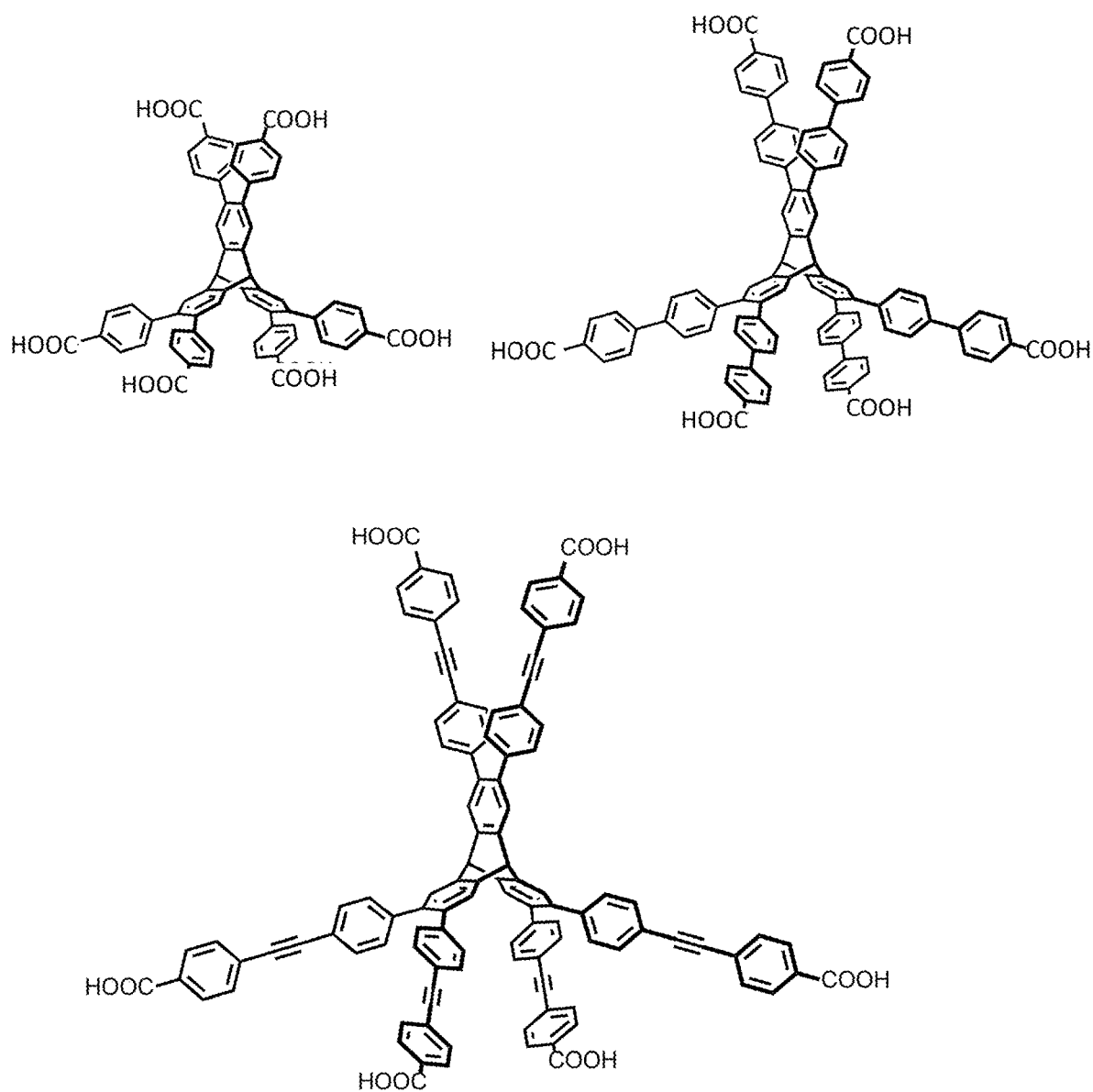
FIG. 2A shows structures of organic ligands used in the Example.
Figure 2B:
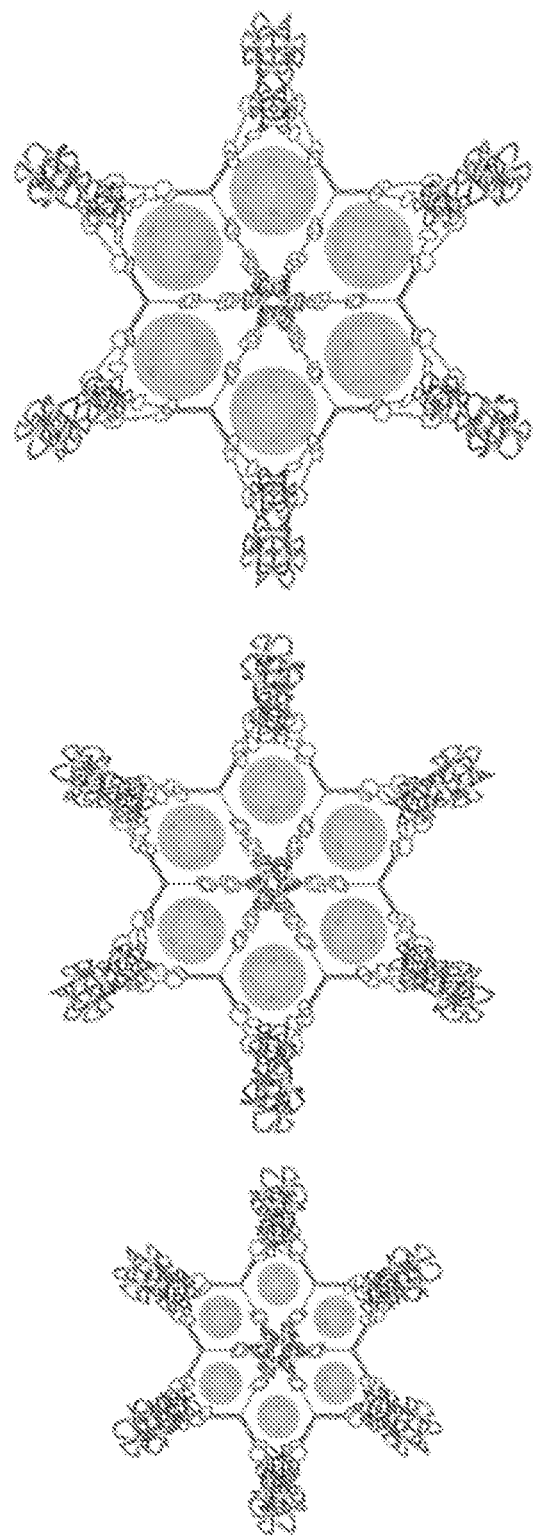
FIG. 2B shows the representative structures of NU-1600, NU-1601, and NU-1602 viewed along the b-axis.

Three embodiments of zirconium MOFs having a 6,12-coordinated alb network topology constructed from three-fold disordered $Zr_6$ nodes and peripherally extended triptycene-based linkers (FIG. 2A) are shown in FIG. 2B. These Zr-MOFs are designated NU-1600, NU-1601, and NU-1602 and are described in greater detail in the Example. In the ideal structures of these MOFs, each peripherally extended triptycene ligand is coordinated to six $Zr_6$ nodes, and each 3-fold disordered $Zr_6$ node is coordinated to 12 peripherally extended triptycene linkers, rendering the 6,12-c alb net topology. However, the MOFs can be synthesized with structural defects, whereby some of the organic linkers are missing.

The MOFs can be synthesized by dissolving a metal salt containing the node metal (e.g., a zirconium salt if the MOF is a Zr-MOF), at least one peripherally extended triptycene ligand, and an acid in a solvent to form a solution. The solution is then heated under conditions (temperatures and heating times) that induce the crystallization of the MOF from the zirconium salt and the peripherally extended triptycene ligands. The triptycene ligands used in the synthesis have structures corresponding to the triptycene linkers, except that in the ligands, the R1 groups represent reactive functionalities, such as carboxyl groups (FIG. 2A). Suitable zirconium salts for the synthesis of Zr-MOFs include zirconium halide salts, such as zirconium chloride. Suitable acids include organic acids, such as formic acid. Generally, suitable temperatures for inducing the crystallization of the MOFs are in the range from about 120° C. to about 140° C., and suitable heating times are in the range from about 1 day to about 5 days. However, times and temperatures outside of these ranges can be used. The MOFs can be obtained as single-crystals or polycrystalline powders.

Missing linker defects in the MOFs expose Lewis-acidic M-OH-M sites on the $M_6$ nodes. This is advantageous because the exposed Lewis-acidic sites render the MOFs catalytically active for the hydrolysis of organic compounds. Examples of organic compounds that can be hydrolyzed include organophosphonate-based molecules, some of which are used as nerve agents. As such, the MOFs described herein can be used to deactivate nerve agents having hydrolysable bonds by exposing the nerve agents to a MOF in the presence of water whereby the MOF catalyzes the hydrolysis of the nerve agent. The exposure is also desirably carried out in the presence of and a liquid or solid base in order to enhance the hydrolysis. suitable bases include N-ethylmorpholine, linear polyethylenimine (PEI), branched PEI, and PEI dendrimers.

The Example below provides a detailed description of methods of synthesizing and characterizing Zr-MOFs having edge-transitive 6,12-coordinated alb network topologies. However, it should be understood that, although the preceding description and the Example focus on zirconium MOFs, other isostructural MOFs having the edge-transitive 6,12-coordinated alb network topology can be made using the same methods by substituting the zirconium salts with salts of other metals in the synthesis. For the purpose of this disclosure, a MOF is isostructural with a zirconium MOF if its structure differs from that of the zirconium MOF only in that the metal of the metal node is a metal other than zirconium. These isostructural MOFs differ from the Zr-MOFs described herein with respect to the nature of the metal in the inorganic nodes. For example, isostructural hafnium MOFs (Hf-MOFs), cerium MOFs (Ce-MOFs), and thorium MOFs (Th-MOFs) can be synthesized using hafnium salts, cerium salts, and thorium salts, respectively.

EXAMPLE

Figure 3:
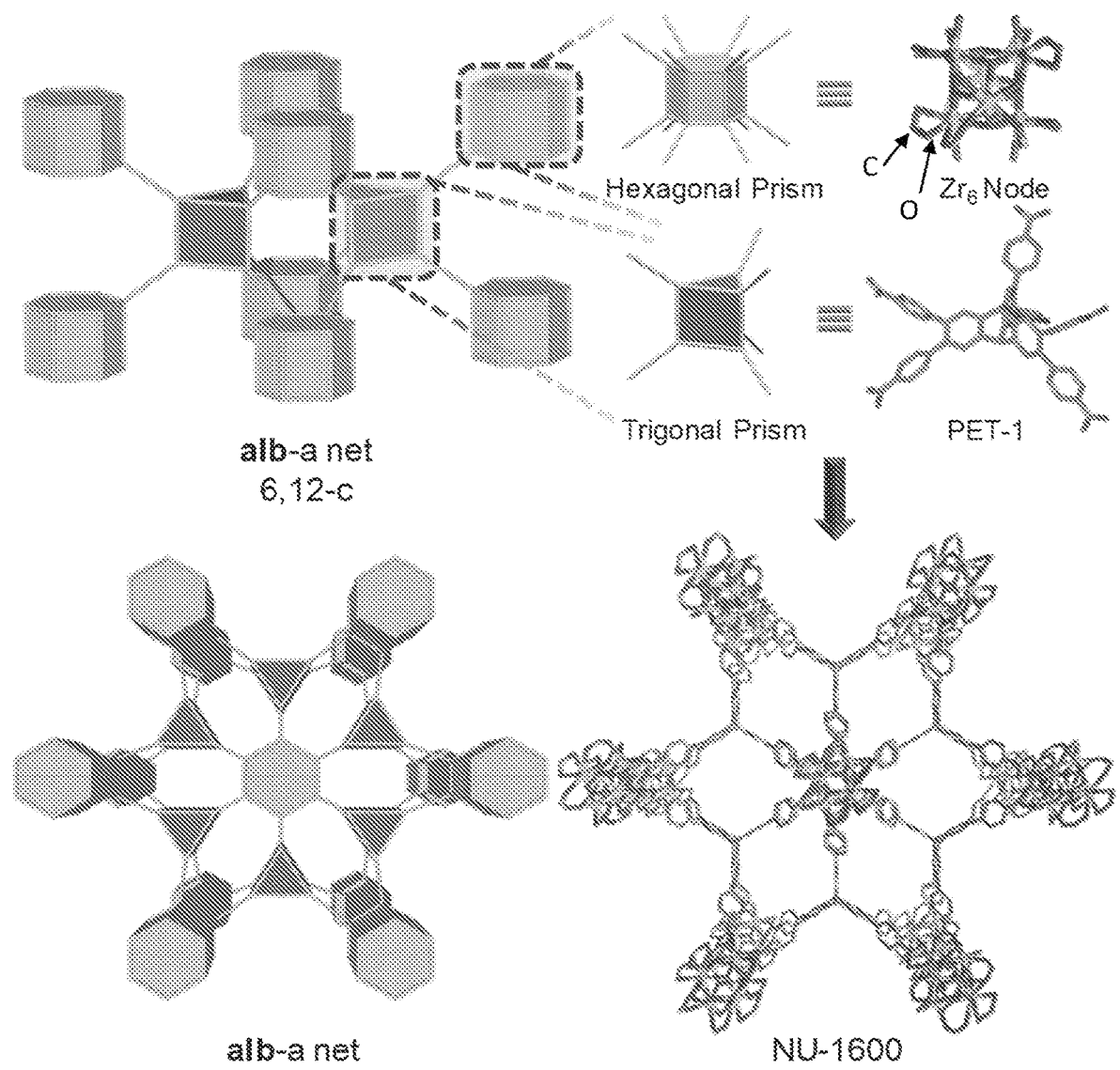
FIG. 3 shows the top-down design and synthesis of a highly connected Zr-MOF with rigid trigonal prismatic linkers, NU-1600, based on 6,12-c edge-transitive alb-net. H atoms are omitted for the sake of clarity. (A color version of this figure can be found in Chen, Zhijie, et al. "Ligand-directed reticular synthesis of catalytically active missing zirconium-based metal-organic frameworks." *Journal of the American Chemical Society* 141.31 (2019): 1229-12235.)

This Example describes the reticular synthesis of a Zr-MOF with the rare 6,12-c alb net, NU-1600, constructed from three-fold disordered $Zr_6$ nodes and the peripherally extended triptycene ($H_6$PET-1) ligands with a rigid trigonal prismatic shape. Single crystal X-ray diffraction (SCXRD) analysis revealed the 6-c trigonal prism PET-1 ligands and the 12-c $Zr_6$ nodes act as rare hexagonal prismatic secondary building units (SBUs) and led to the assembly of 3-periodic NU-1600 with the alb net (FIG. 3). NU-1600 is microporous, with an apparent BET surface area of 2085 $m^2$ $g^{-1}$ and experimental pore volume (PV) of 0.82 $cm^3$ $g^{-1}$, as revealed by the $N_2$ adsorption isotherm at 77 K. The expanded mesoporous isoreticular structures—i.e., NU-1601 and NU-1602—with an experimental PV up to 2.36 $cm^3$ $g^{-1}$ can be readily synthesized with extended ligands, namely, $H_6$PET-2 and $H_6$PET-3, respectively. On account of the Lewis acidic Zr—OH—Zr sites, NU-1600 exhibited excellent catalytic performance towards the destruction of nerve agent simulants in the presence of both liquid and solid bases.

The alb net was constructed from 6-c trigonal prismatic SBUs and 12-c hexagonal prismatic SBUs. The (6,12)-c alb net is a highly connected net. In this Example, the augmented net (alb-a) was used to illustrate the topological network. The use of rigid trigonal prismatic ligands, PET-1, guided the in-situ formation of 12-c $Zr_6$ nodes as hexagonal prismatic SBUs, thus resulting in a 3-periodic structure with the alb net.

Figure 4:
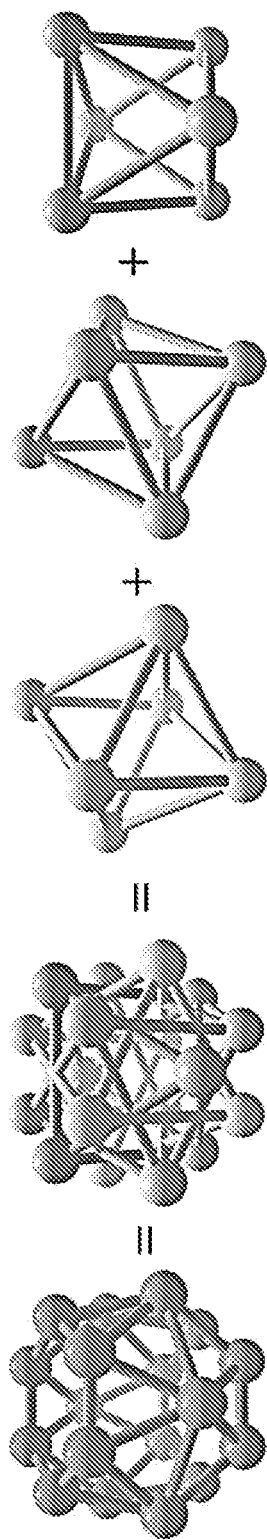
FIG. 4 shows the observed $Zr_{18}$ cluster (left) and overlapping $Zr_6$ clusters, each exhibiting partial crystallographic occupancy of 1/3 (right).
Figure 5:
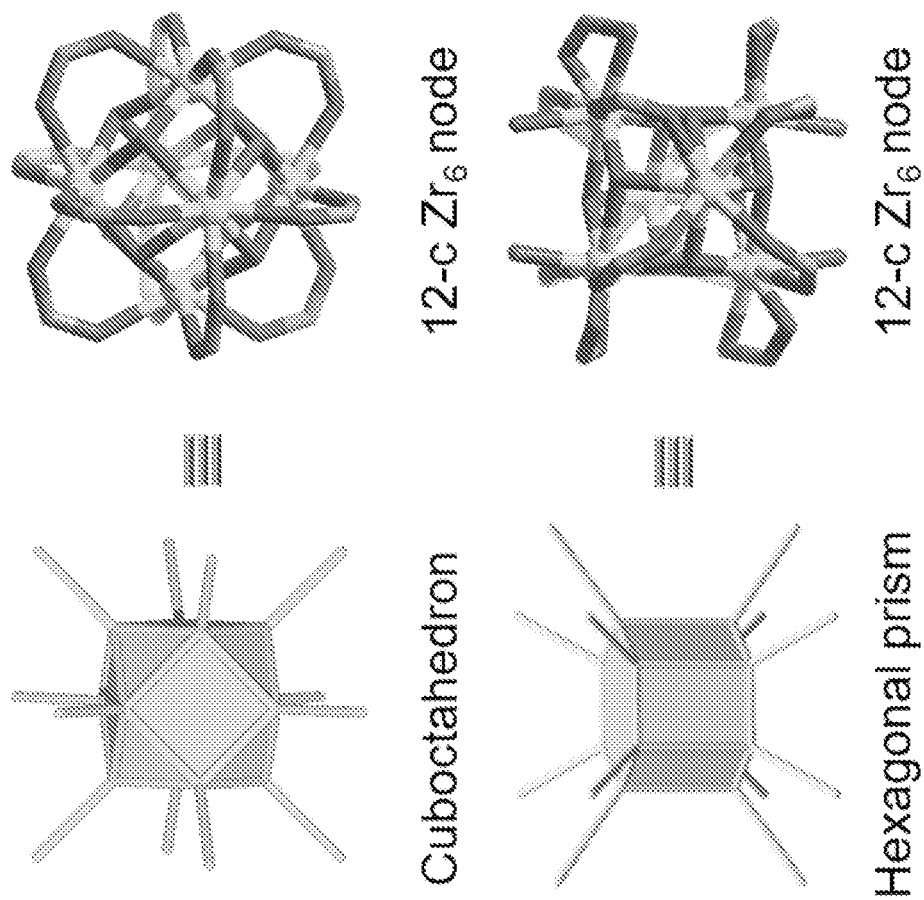
FIG. 5 shows a comparison of 12-connected $Zr_6$ node of UiO-66 and 12-connected $Zr_6$ node of NU-1600.

Indeed, single crystals of NU-1600 with suitable sizes for SCXRD investigation were obtained after carefully fine-tuning the synthetic conditions—i.e., $ZrCl_4$, PET-1, and acidic modulators were dissolved in N,N-diethylformamide (DEF), and the mixture was then kept at 130° C. for 4 days. The SCXRD analysis revealed NU-1600 crystallizes in the P2/m space group (a=21.632 (1), b=12.2815(5), c=21.627 (1) Å and β=119.975(2)° at 100 K) with an ideal formula, $Zr_6(\mu_3$-O$)_2(\mu_3$-OH$)_6$(HCOO)(OH)($H_2$O)(PET-1$)_2$, without considering the missing-linker defects (Table 2 and FIG. 4). Each PET-1 ligand of NU-1600 was coordinated to six $Zr_6$ nodes and each 3-fold disordered $Zr_6$ node was coordinated to 12 PET-1 linkers, rendering the expected 6,12-c alb net. The 12-c $Zr_6$ node of NU-1600, which can be viewed as a hexagonal prismatic SBU, was different from the 12-c $Zr_6$ node of UiO-66—i. e., a cuboctahedron SBU (FIG. 5). NU-1600 can alternatively be further analyzed as the (3,6,6)-c alb-derived ury net, if the ligand is deconstructed into two types of 3-c SBUs.

TABLE 2

Crystallographic data of NU-1600, NU-1601 and NU-1602

|  | NU-1600 | NU-1601 | NU-1602 |
| --- | --- | --- | --- |
| Formula | $C_{88.50}H_{45.20}O_{36}Zr_6$ | $C_{198}H_{114}O_{36}Zr_6$ | $C_{220}H_{112}O_{36}Zr_6$ |
| Formula Weight | 2231.76 | 3616.21 | 3878.41 |
| Temperature (K) | 100 K | 275 K | 275 K |
| Wavelength (Å) | 1.54178 | 0.71073 | 1.54178 |
| Crystal system | Monoclinic | Monoclinic | Monoclinic |
| Space group | P2/m (no. 10) | P2/m (no. 10) | P2/m (no. 10) |
| a (Å) | 21.632(1) | 28.130(3) | 31.678(8) |
| b (Å) | 12.2815(5) | 16.7348(18) | 19.591(4) |
| c (Å) | 21.627 (1) | 28.174(3) | 31.774(10) |
| β (°) | 119.975(2) | 120.036(4) | 119.631(15) |
| V (Å$^3$) | 4977.2(4) | 11482(2) | 17141(8) |
| Z | 1 | 1 | 1 |
| Calcd Density (g/cm$^3$) | 0.745 | 0.523 | 0.376 |
| μ (mm$^{-1}$) | 2.827 | 0.160 | 0.890 |
| F(000) | 1100 | 1830 | 1960 |
| Crystal size (mm$^3$) | 0.10 × 0.06 × 0.06 | 0.20 × 0.16 × 0.10 | 0.14 × 0.14 × 0.08 |
| $\theta_{min}$, $\theta_{max}$(°) | 2.358, 54.224 | 0.836, 23.356 | 2.255, 57.196 |
| Total reflection | 17044 | 46590 | 42343 |
| Unique reflection | 5944 | 16946 | 16964 |

TABLE 2-continued

Crystallographic data of NU-1600, NU-1601 and NU-1602

| | NU-1600 | NU-1601 | NU-1602 |
|---|---|---|---|
| Parameter number | 547 | 795 | 813 |
| $R_{int}$ | 0.0461 | 0.0774 | 0.0754 |
| Goodness-of-fit | 1.671 | 1.258 | 1.345 |
| $R_1$ [I > 2 σ(I)] | 0.1328 | 0.1259 | 0.1418 |
| $wR_2$ (all reflection) | 0.4298 | 0.3909 | 0.4436 |
| CCDC-number | 1908939 | 1908940 | 1908941 |

Figure 6:
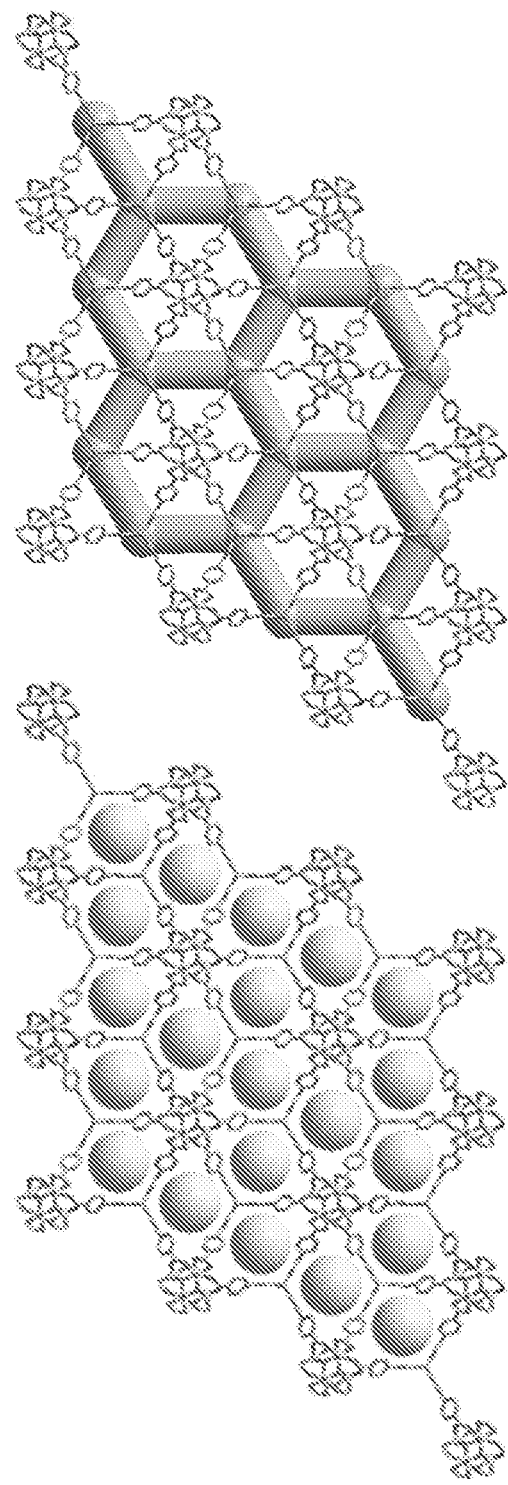
FIG. 6 shows diamond-shaped channels along the b axis (left) and 2D honeycomb (hcb) shaped channels in the ac-plane inside NU-1600.
Figure 7A:
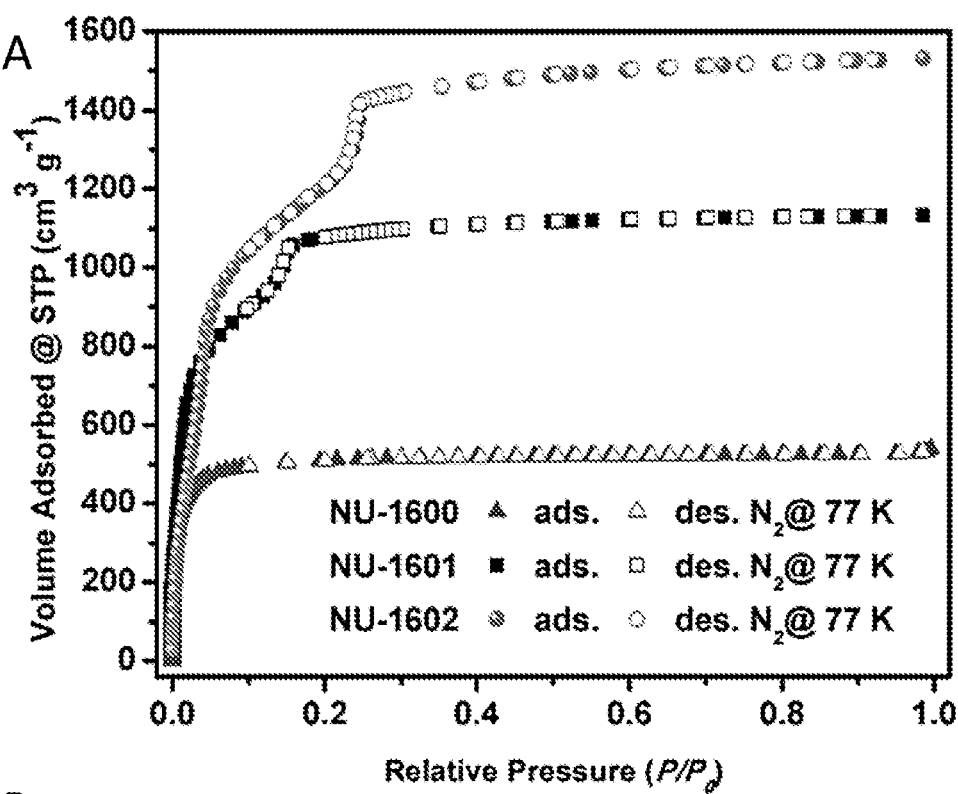
FIGS. 7A-7B show experimental $N_2$ adsorption and desorption isotherms at 77 K (FIG. 7A) and DFT pore size distribution (FIG. 7B) of NU-1600, NU-1601, and NU-1602.
Figure 7B:
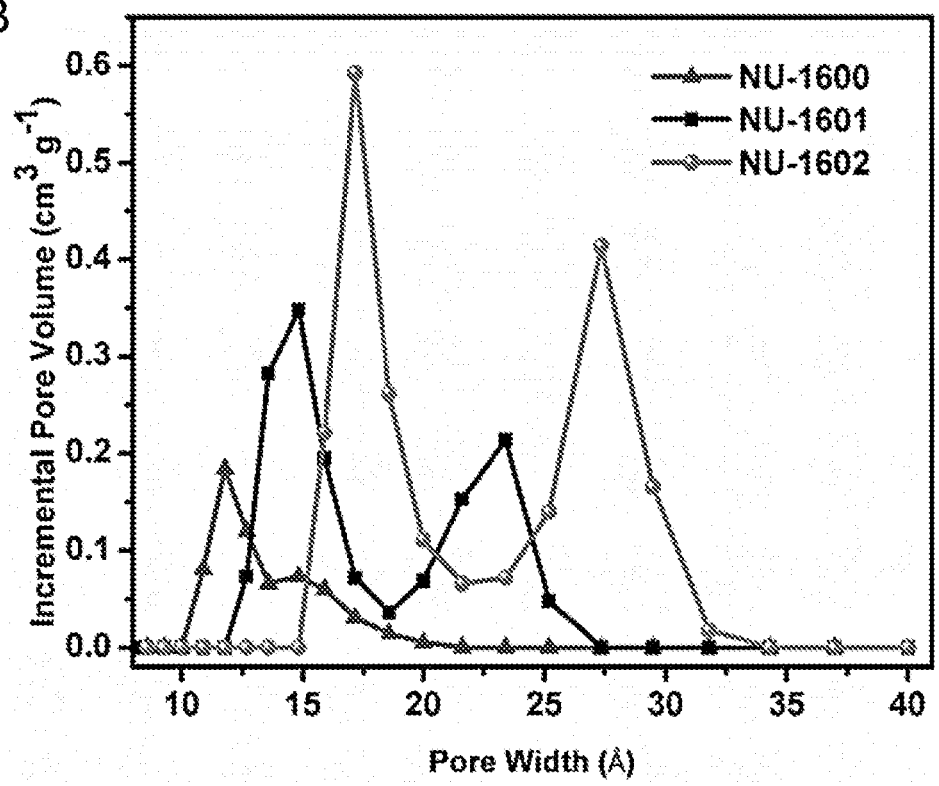

NU-1600 contains one type of diamond-shaped channels of ca. 1.1 nm along the b-axis and 2-dimensional honeycomb-shaped channels in the ac-plane (FIG. 6). The microcrystalline sample of NU-1600 was synthesized with sizes of 1-2 μm, as revealed by a scanning electron microscope (SEM) image. The phase purity of the bulk NU-1600 was confirmed by the well-matched simulated and as-synthesized powder X-ray diffraction (PXRD) patterns. The permanent porosity of NU-1600 was confirmed (FIGS. 7A-7B) by the $N_2$ adsorption isotherm at 77 K with an estimated apparent BET area of 2085 $m^2 g^{-1}$. The experimental total PV of 0.82 $cm^3 g^{-1}$ was higher than the simulated value—i.e., 0.69 $cm^3 g^{-1}$—for the structure when PET-1 had 100% occupancy inside NU-1600 but agreed well with the simulated PV—i.e., 0.83 $cm^3 g^{-1}$—when PET-1 had 70% occupancy (Table 3). In fact, the best crystallographic refinement of SCXRD was obtained for NU-1600 when the occupancy level of PET-1 was around 70%, indicating the presence of missing-linker defects. Pore-size distribution based on a density functional theory (DFT) model from the $N_2$ adsorption isotherm revealed one type of main pore centered at 1.2 nm, which agrees (FIG. 7B) with the size of diamond channels. Extra pores ranging from 1.5 to 2.2 nm could be associated with the missing-linkers defects.

TABLE 3

Measured and Simulated Properties for NU-1600 series MOFs.

| Materials | Gravimetric BET area ($m^2 g^{-1}$) | Crystallographic density (g $cm^{-3}$) | Pore volume (exp.[a]/sim.[b]) ($cm^3 g^{-1}$) | Volumetric BET area[c] ($m^2 cm^{-3}$) |
|---|---|---|---|---|
| NU-1600 | 2085 | 0.882 | 0.82/0.69 | 1520 |
| NU-1600-70% Linker[d] | 2085 | 0.731 | 0.82/0.83 | 1840 |
| NU-1601 | 3970 | 0.519 | 1.75/1.45 | 2060 |
| NU-1602 | 4500 | 0.429 | 2.36/1.80 | 1930 |

[a]calculated by single point method at $P/P_0$ = 0.95.
[b]calculated based on crystal structures or optimized structure.
[c]calculated based on crystallographic density.
[d]The occupancy of the ligand is refined to 70%.

Highly connected edge-transitive nets induce higher degrees of designability with precise choices of building units. They offer more possibilities towards elongated isoreticular structures without catenation. Solvothermal reactions of longer peripherally extended triptycene ligands—i.e., $H_6$PET-2 and $H_6$PET-3—and $ZrCl_4$ under similar synthetic conditions as NU-1600 yielded colorless hexagonal block crystals, namely NU-1601 and NU-1602. SCXRD studies revealed both materials have non-catenated structures crystallizing in the P2/m space group (NU-1601: a=28.130(3), b=16.735(2), c=28.174(3) (1) Å and β=120.036(4)° at 275 K; NU-1602: a=31.678(8), b=19.591 (4), c=31.774(1) Å and β=119.631(2)° at 275 K). The phase purity of the bulk NU-1601 and NU-1602 was confirmed by the well-matched simulated and as-synthesized PXRD patterns. Topological analysis revealed NU-1601 and NU-1602 have the same underlying 6,12-c alb topology as NU-1600, with 3-fold disordered $Zr_6$ nodes and extended PET ligands as 12-c hexagonal prismatic and 6-c trigonal prismatic SBUs, respectively.

$N_2$ adsorption isotherms at 77 K of NU-1601 and NU-1602 after supercritical $CO_2$ activation revealed that both structures are mesoporous MOFs with the experimental total PV of 1.75 and 2.36 $cm^3 g^{-1}$ at $P/P_0$=0.95, respectively. NU-1601 and NU-1602 exhibited $N_2$ uptakes at 77 K and $P/P_0$=0.95 of 1133 and 1531 $cm^3 g^{-1}$, respectively. Pore-size distributions of NU-1601 and NU-1602, based on DFT models from the $N_2$ adsorption isotherms, revealed main pores centered at 1.4 and 1.7 nm, respectively, which agree with the sizes of the diamond channels. The extra mesopores—i.e., 2.2 and 2.7 nm—similar to NU-1600, can be attributed to missing-linker defects. The apparent BET areas of NU-1601 and NU-1602 were estimated to be 3970 and 4500 $m^2 g^{-1}$, respectively, after satisfying the four BET consistency criteria with correlation coefficients higher than 0.995 (Table 4).

TABLE 4

The linear regions selected for BET calculation for NU-1600 series MOFs.

| MOFs | $P/P_0$ (min)[a] | $P/P_0$ (max)[a] | BET area ($m^2 g^{-1}$) | C[b] | $R^2$[c] | $1/(\sqrt{C}+1)$ | $P/P_0$ ($N_m$) | Four BET consistency criteria fulfilled[d] |
|---|---|---|---|---|---|---|---|---|
| NU-1600 | 0.013 | 0.060 | 2085 | 293.3 | 0.999 | 0.055 | 0.058 | 1, 2, 3, 4 |
| NU-1601 | 0.046 | 0.151 | 3970 | 83.7 | 0.995 | 0.099 | 0.108 | 1, 2, 3, 4 |
| NU-1602 | 0.080 | 0.244 | 4500 | 79.4 | 0.995 | 0.101 | 0.095 | 1, 2, 3, 4 |

[a] Different linear regions were selected for BET calculation.
[b] C is related to the energetics of adsorptions according to BET theory.
[c] $R^2$ is the correlation coefficient.
[d] The four BET consistency criteria proposed by Rouquerol et al.:
(1) Only a range where $N(1 - P/P_0)$ increases monotonically with $P/P_0$ should be selected. (N is the adsorbate loading and $P/P_0$ is relative pressure.)
(2) The value of C resulting from the linear regression should be positive.
(3) The monolayer loading $N_m$ should correspond to a relative pressure $P/P_0$ falling within the selected linear region.

TABLE 4-continued

The linear regions selected for BET calculation for NU-1600 series MOFs.

| MOFs | $P/P_0$ (min)[a] | $P/P_0$ (max)[a] | BET area $(m^2 g^{-1})$ | C[b] | $R^2$ [c] | $1/(\sqrt{C}+1)$ | $P/P_0$ $(N_m)$ | Four BET consistency criteria fulfilled[d] |
|------|------|------|------|---|---|---|---|---|

(4) The relative pressure corresponding to the monolayer loading calculated from BET theory ($1/\sqrt{C}+1$) should be equal to the pressure determined in criterion 3. (Rouquerol, J. L. et al., In Studies in Surface Science and Catalysis. Llewellyn, P. et al., Eds, Ed. Elsevier: Amsterdam, 2007; Vol. 160, p 49.) (For this criterion, Rouquerol et al. suggested a tolerance of 20%.). (Llewellyn, P. et al., In *Adsorption by Powders and Porous Solids (Second Edition)*, Academic Press: Oxford, 2014; pp 565-610; Gómez-Gualdrón, D. A. et al., *J. Am. Chem. Soc.* 2016, 138, 215-224.)

The Zr-MOFs were evaluated for the hydrolysis of dimethyl 4-nitrophenyl phosphonate (DMNP), a nerve agent simulant mimicking the reactivity of organophosphonate-based nerve agents, on account of Lewis acidic Zr—OH—Zr sites on their Zr nodes. Taking advantage of the missing-linker defects in NU-160X (X=1, 2, 3), which expose the Lewis acidic sites on the Zr nodes, the hydrolysis of DMNP was explored using micro-sized (1-4 μm) crystals of NU-160X (X=1, 2, 3) in the presence of liquid N-ethylmorpholine and solid linear polyethyleneimine (PEI) (FIGS. 8A-8D). The initial half-life of DMNP in the presence of N-ethylmorpholine with NU-1600 (6 mol % catalyst loading) was quite fast ($t_{1/2}$=~1 min), with a turn-over frequency (TOF) of 0.21 s$^{-1}$. Under the same conditions, the hydrolysis of DMNP exhibited similar TOFs, namely 0.22 s$^{-1}$ for 3 mol % and 0.15 s$^{-1}$ for 1.5 mol % of the catalyst (Tables 5-6).

TABLE 5

Hydrolysis rate ($t_{1/2}$) and turn-over frequencies (TOFs) for hydrolysis of DMNP with NU-1600 series MOFs in various bases.[a]

| MOFs | Bases | $t_{1/2}$ [min] | TOF[b] [s$^{-1}$] |
|------|-------|------|------|
| NU-1600 | N-ethylmorpholine | 0.7 | 0.21 |
| NU-1600 | linear PEI, MW2500[c] | 2.9 | 0.05 |
| NU-1600[d] | linear PEI, MW2500[c] | 2.9 | 0.05 |
| NU-1601 | N-ethylmorpholine | 3.2 | 0.04 |
| NU-1602 | N-ethylmorpholine | 2.5 | 0.06 |

[a]The amount of MOF catalysts is 6 mol %.
[b]TOF values were calculated at tin for simplicity.
[c]Molecular weight (MW) in g/mol.
[d] MOFs (full loading, 6 mol %) and linear PEI were suspended in 3 mL of water. After centrifugation, MOF/PEI composite was washed with 3 mL of water twice and then dispersed in H$_2$O/D$_2$O for hydrolysis.

TABLE 6

Hydrolysis rate ($t_{1/2}$) and TOFs for hydrolysis of DMNP with NU-1600 of different loadings.[a]

| MOFs | Loading | $t_{1/2}$ [min] | TOF[b] [s$^{-1}$] |
|------|---------|------|------|
| NU-1600 | 6 mol % | 0.7 | 0.21 |
| NU-1600 | 3 mol % | 1.3 | 0.22 |
| NU-1600 | 1.5 mol % | 3.6 | 0.15 |

[a]The base here is N-ethylmorpholine 6 mol %.
[b]TOF values were calculated at $t_{1/2}$ for simplicity.

Moreover, NU-1600 can efficiently hydrolyze DMNP in the presence of a solid base—i.e., linear PEI—with $t_{1/2}$=~3 min and TOF=0.05 s$^{-1}$. After washing with water, the NU-1600/PEI composite displayed similar reactivity, confirming the heterogeneous nature of PEI base, which is more practical for protective suit and mask applications. NU-1601 and NU-1602 showed similar performance towards the hydrolysis of DMNP with $t_{1/2}$=~3.2 and 2.5 min, respectively, slightly slower than NU-1600. This data suggest that the higher degree of missing-linker defects in NU-1600 compared with either NU-1601 or NU-1602, as illustrated by the thermogravimetric analysis (TGA) under air flow (Table 7), induces more Lewis acidic Zr—OH—Zr catalytic sites for the hydrolysis to occur, since the particle sizes of these isoreticular materials are similar.

TABLE 7

The percentage of linkers compared to ideal structure based on TGA data.

| MOFs | Linker per Zr$_6$ node (ideal) | Linker per Zr$_6$ node (TGA) | The percentage of linkers compared to ideal structure |
|------|------|------|------|
| NU-1600 | 2 | 1.2 | 60% |
| NU-1601 | 2 | 1.6 | 80% |
| NU-1602 | 2 | 1.6 | 80% |

Figure 8A:
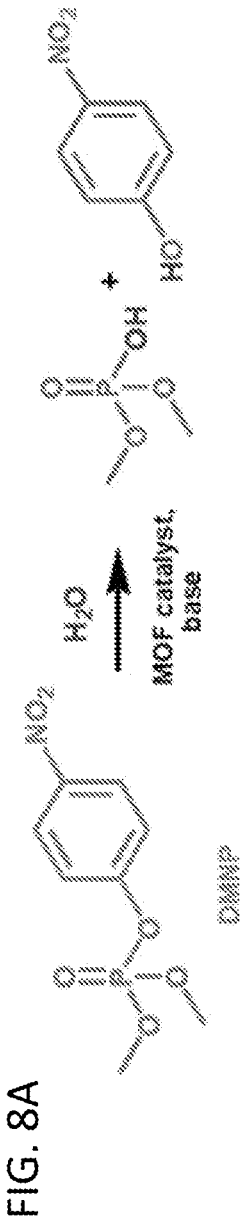
FIG. 8A shows the hydrolysis reaction of DMNP.
Figure 8B:
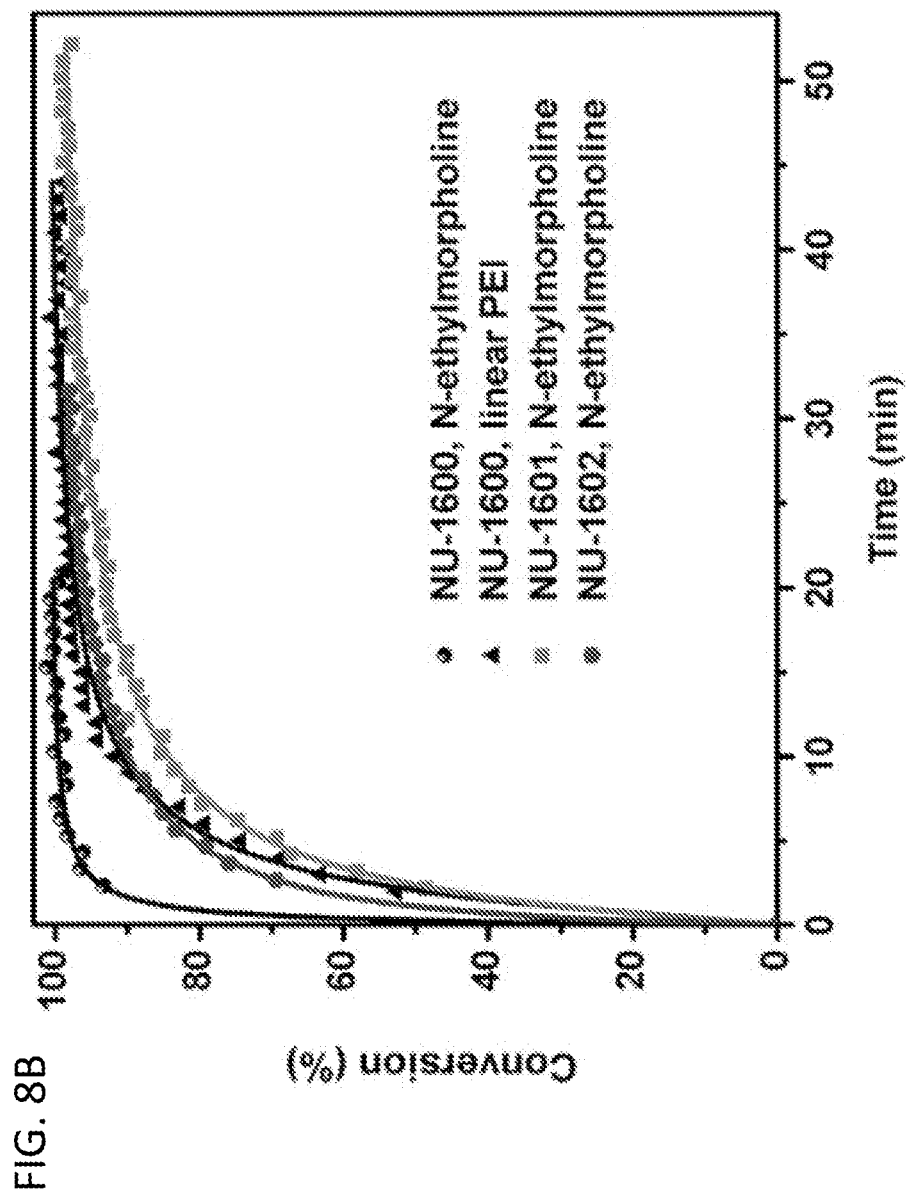
FIG. 8B shows the hydrolysis profile of DMNP with NU-160X (X=1, 2, 3) using 6 mol % catalyst loading in the presence of different bases: N-ethylmorpholine and linear PEI.
Figure 8C:
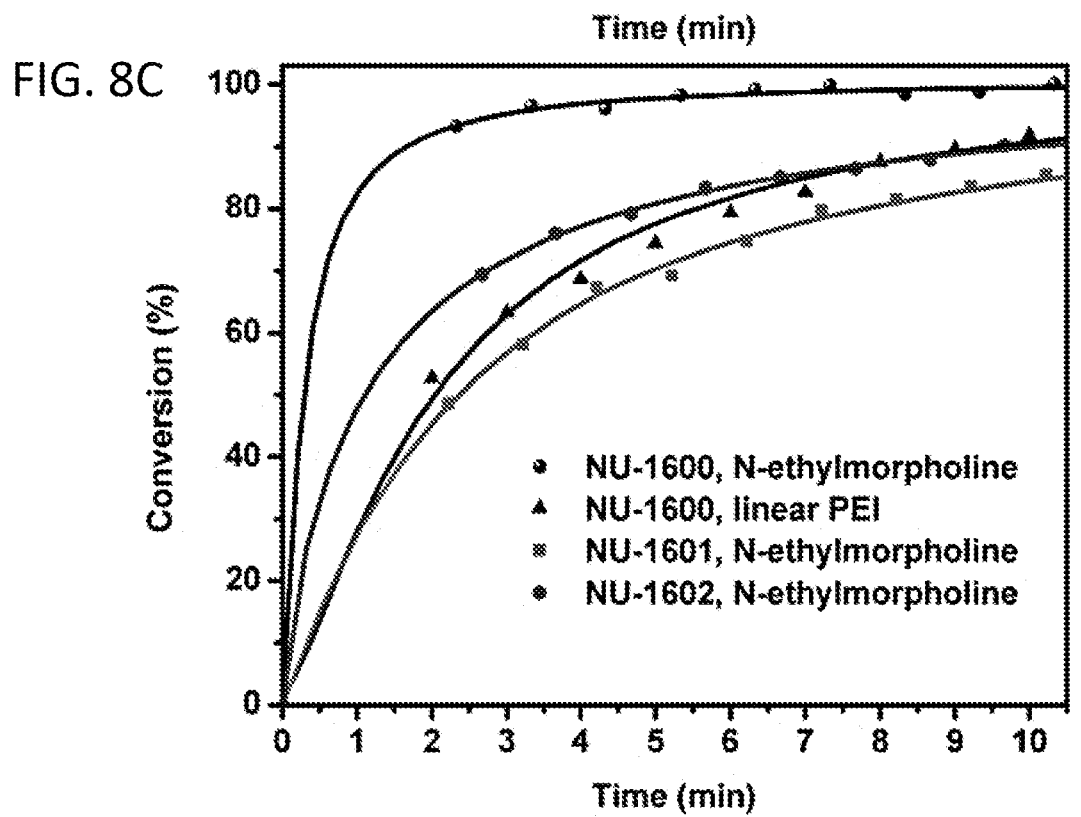
FIG. 8C shows the first 10 mins of the hydrolysis profile shown in FIG. 8B for clarity. Solid lines are used as a guide.
Figure 8D:
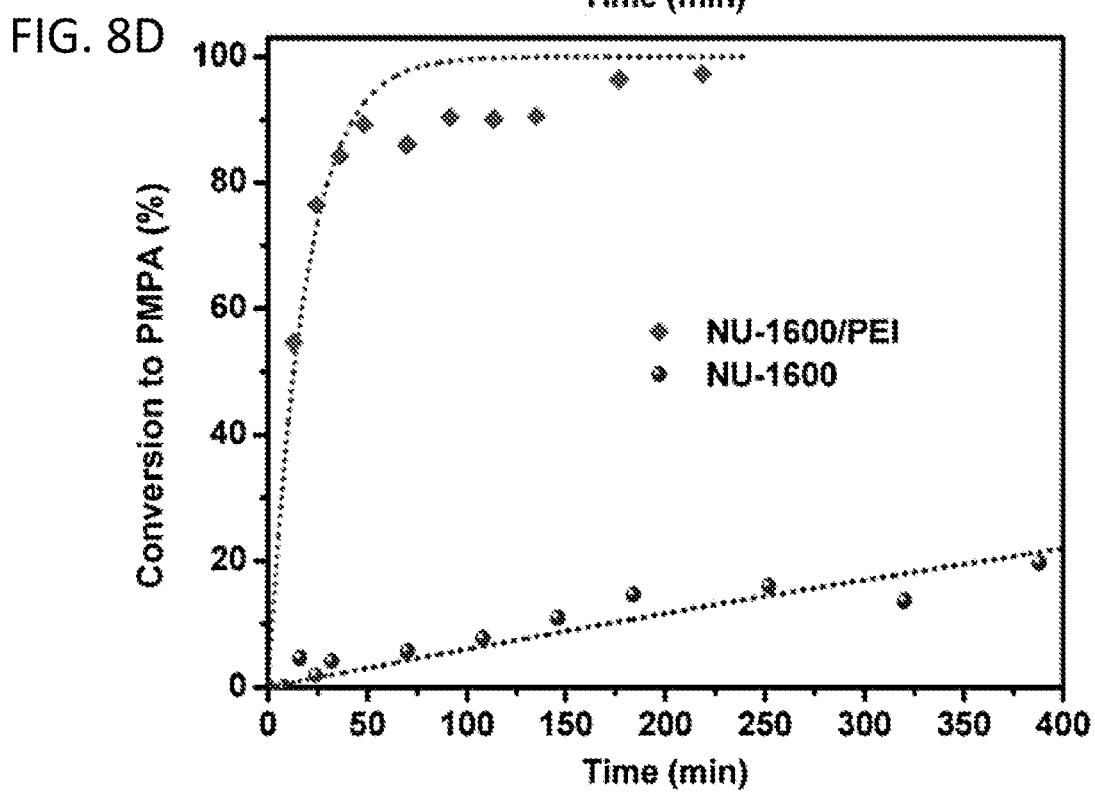
FIG. 8D shows conversion vs. time data for NU-1600 and NU-1600/PEI for the hydrolysis of soman. Dotted lines correspond to first-order fits.
Figure 9:
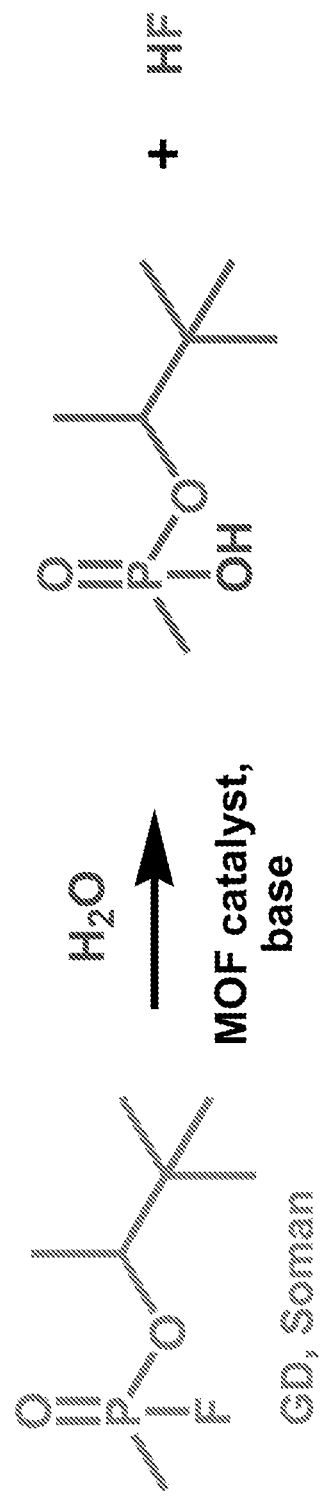
FIG. 9 shows a hydrolysis reaction of GD, Soman.

The NU-1600/PEI composite enhances hydrolysis rates of actual nerve agent—soman (GD), as compared to NU-1600. The conversion of GD to the non-toxic pinacolyl methylphosphonic acid (PMPA) as a function of time is shown in FIG. 9 and FIG. 8D, and $^{31}$P NMR spectra show PMPA conversion. The enhanced reactivity arising from the solid-state PEI base is clear, with 50% of GD reacting on the NU-1600/PEI sample in under 12 min as compared to only 20% GD reacting on baseline NU-1600 after 400 min. Rates calculated from a first-order kinetic model are 6.2×10$^{-4}$ and 5.4×10$^{-2}$ min$^{-1}$ for NU-1600 and NU-1600/PEI, respectively. This demonstrates NU-1600/PEI composite can efficiently detoxify chemical warfare agent.

In conclusion, a series of missing Zr-MOFs, NU-160X series (X=1, 2, 3), was rationally designed and synthesized with the edge-transitive 6,12-c alb topology. The highly connected alb net provided a blueprint for programmable non-catenated MOF structures with tunable surface areas and tailorable porosity ranging from microporous to mesoporous. These Zr-MOFs displayed notable activities towards the efficient destruction of a nerve agent, as well as its simulant, in the presence of liquid and solid bases because of structural defects. This research illustrates the power of reticular chemistry for the rational design and synthesis of functional, highly connected materials, and paves the way for correlating unique material properties with desired functionalities.

Materials and General Procedures

All reagents were obtained from commercial sources and used without further purification, unless otherwise noted. The ligands-peripherally extended triptycene (H$_6$PET) were synthesized according to a previous report. (Li, P. et al., *Angew. Chem. Int. Ed.* 2019, 58, 1664-1669.) Caution! GD is extremely toxic. Experiments should be run by trained personnel using appropriate safety procedures.

X-Ray Diffraction Analyses. PXRD of MOFs were measured at room temperature on a STOE-STADI MP powder diffractometer equipped with an asymmetric curved Germanium monochromator (CuKα1 radiation, λ=1.54056 Å) and a one-dimensional silicon strip detector (MYTHEN$_2$ $_1$K from DECTRIS). The line focused Cu X-ray tube was operated at 40 kV and 40 mA. The activated powder was sandwiched between two Kapton foils and measured in transmission geometry in a rotating holder. Intensity data from 1 to 30 degrees two theta were collected over a period of 6 minutes. The instrument was calibrated against a NIST Silicon standard (640d) prior to the measurement.

N$_2$ Sorption Measurements. N$_2$ adsorption and desorption isotherms on activated materials were measured at Northwestern University on an ASAP 2020 (Micromeritics) instrument at 77 K, respectively.

SEM images were taken using a Hitachi SU8030 at the EPIC facility (NUANCE Center-Northwestern University). Samples were activated and coated with 0504 to —9 nm thickness in a Denton Desk III TSC Sputter Coater before imaging.

TGA was performed on a TGA/DCS 1 system (Mettler-Toledo AG, Schwerzenbach, Switzerland), which runs on a PC with STARe software. Samples were heated from 30° C. to 600° C. at a rate of 5° C./min under air with flow rate 60 mL/min.

Optical photos of the single crystals were obtained from a Nikon SMZ1500 stereozoom microscope coupled to a digital camera and PC (video monitor).

Supercritical CO$_2$ (ScCO$_2$) procedure: Supercritical CO$_2$ activation experiments (Nelson, A. P. et al., *J. Am. Chem. Soc.* 2009, 131, 458-460; Farha, O. K. et al., *J. Am. Chem. Soc.* 2012, 134, 15016-15021) were performed on a Tousimis Samdri PVT-30 critical point dryer. Before doing the ScCO$_2$ drying, the as synthesized materials were soaked in DMF for 3 days. The solvent was refreshed every 12 h, and 12 mL of fresh DMF was added into the vials (or tubes). After three days, the solvent (DMF) was centrifuged and removed. The materials were then soaked in ethanol for 3 days to fully exchange with the DMF in the materials. During this time, the ethanol was refreshed every 12 h with 10 mL of fresh ethanol added into the vials (or tubes). After removing solvents, the material was transferred to a small glass container for ScCO$_2$ drying (Note: do not let the materials dry in ethanol, and make sure the materials are always submerged in ethanol before applying ScCO$_2$ drying procedure).

Hydrolysis profiles were recorded by in situ $^{31}$P NMR spectroscopy at room temperature. MOF catalyst 1.5 μmol (NU-1600, NU-1601 and NU-1602 (corresponds to 6 mol % catalyst) (Zr$_6$ node) microcrystalline powder samples), were weighted using a microbalance and were transferred into a 1.5-dram (-5.5 mL) vial and 0.4 M N-ethylmorpholine solution (1.05mL; 0.05 mL N-ethylmorpholine, 0.9 mL deionized water and 0.1 mL D$_2$O) was added to the solution. The vial was then sonicated for 1 min to homogeneously disperse the material. DMNP (4 0$_{—4}$ 25 μmol) was added to the mixture solution and swirled for 15 sec. The reaction mixture was then transferred to an NMR tube and the spectrum was immediately measured. The first data point was collected 120 seconds following the start of the reaction. The progress of the reaction was monitored in 1-minute increments for 1 hour or until 100% conversion occurred—whichever occurred first—(number of scans=16, delay time=28 sec). Background reactivity was evaluated under identical conditions, apart from the absence of catalyst, and monitored by in situ $^{31}$P NMR. The density of the MOF did not matter since the same mmol of Zr$_6$ node was used in the experiments. For linear PEI (molecule weight=2500 g/mol), the amount used was15 mg.

GD degradation: NU-1600 and NU-1600/PEI composite (~19 mg; ~4mg NU-1600 and ~15mg PEI) catalyst were loaded into a 5 mm NMR tube followed by the addition of 0.9 mL deionized water and 0.1 mL D20. GD (4.4 μtL, 25 μmol) was then added; the tube was capped and vigorously shaken before being placed into the NMR magnet for monitoring by $^{31}$P NMR spectroscopy (Varian INOVA 400 NMR spectrometer; spectra referenced to external 85% H$_3$PO$_4$). First order kinetic models fit described the NU-1600 data well, while deviation occurred at longer times for the NU-1600/PEI sample, potentially due to a concentration dependence in the buffering scheme or diffusional issues of the byproduct blocking active sites.

Synthesis of Ligands

General Information

All reagents were purchased from commercial suppliers and used without further purification. Hexabromotriptycene, methyl 4-[4-(tetramethyl-1,3,2-dioxaborolan-2-yl)phenyl]benzoate and Pd SPhos Gen III catalyst were synthesized according to known literature procedures. (Kissel, P. et al., *Nat. Chem.* 2014, 6, 774; Vela, S. et al., *Angew. Chem. Int. Ed.* 2016, 55, 15076-15080; Bruno, N. C. et al., *Chem. Sci.* 2013, 4, 916-920.) Thin layer chromatography (TLC) was performed on silica gel F254 (E. Merck). Column chromatography was carried out on silica gel 60F (Merck 9385, 0.040-0.063 mm). Developing plates were visualized using UV light at wavelengths of 254 and 365 nm. High resolution mass spectra were obtained on an Agilent 6210 Time of Flight (TOF) LC-MS, using an ESI source, coupled with Agilent 1100 HPLC stack, using direct infusion (0.6 mL/min). NMR were recorded on a Bruker Avance III 500 MHz system with DCH CryoProbe. Chemical shifts were reported in parts per million (ppm) and were referenced to the residual protio-solvent (CDCl$_3$: $\delta_H$=7.26 ppm, $\delta_C$=77.16 ppm; DMSO-d$_6$: $\delta_H$=2.50 ppm, $\delta_C$=39.52 ppm; (CD$_3$)$_2$CO: $\delta_H$=2.05 ppm, $\delta_C$=29.84 ppm). Spectra were analyzed with Mestrallova software (Version 12.0). Data are represented as follows: chemical shift, multiplicity (s=singlet, d=doublet, t=triplet, q=quartet, bs=broad singlet, m=multiplet), coupling constants in Hertz (Hz), and integration.

Figure 10:
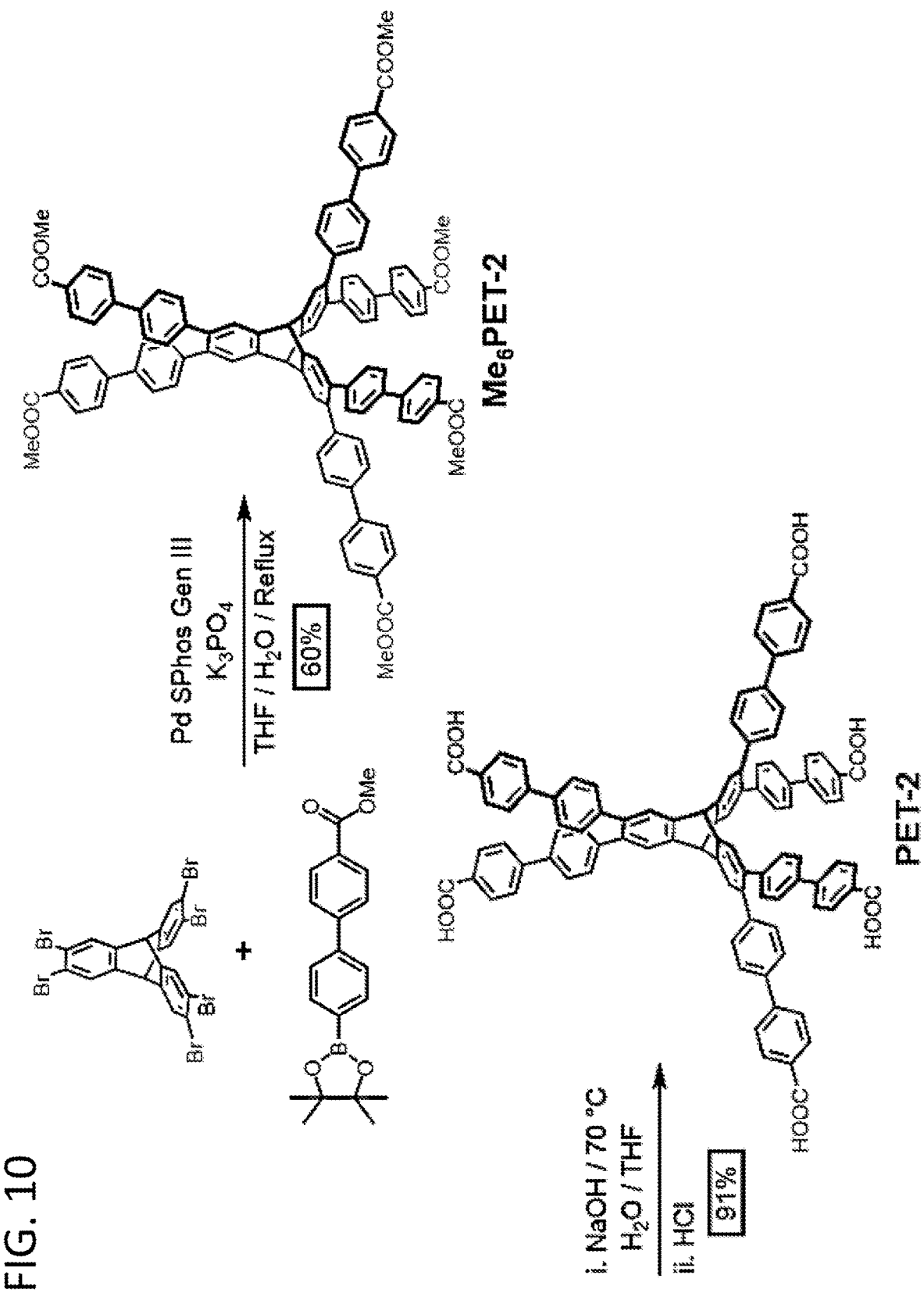
FIG. 10 shows the synthesis of PET-2.

Synthetic Protocols for PET-2 (FIG. 10)

Synthesis of Me$_6$PET-2

Hexabromotriptycene (3.77 g, 5.18 mmol), methyl 4-[4-(tetramethyl-1,3,2-dioxaborolan-2-yl)phenyl]benzoate (12.3 g, 36.3 mmol), Pd SPhos Gen III catalyst (0.20 g, 0.26 mmol) and THF (150 mL) were added to a 500 mL round-bottomed flask equipped with a magnetic stirrer bar. A condenser was attached to the flask and the mixture was degassed by bubbling N$_2$ for 30 min, at which point degassed aqueous K$_3$PO$_4$ solution (2 M, 40 mL) was added. The reaction was heated under reflux in an N$_2$ atmosphere overnight. After cooling to room temperature, the aqueous layer was removed by pipette. THF was removed under reduced pressure and the residue was dissolved in CH$_2$Cl$_2$ (200 mL). The solution was washed with saturated brine solution (100 mL) and dried (Mg$_2$SO$_4$). After removing the solvent, the crude solid was purified by chromatography (SiO$_2$, 0% to 10% EtOAc in CH$_2$Cl$_2$) to give the product as a colorless solid film (4.68 g, 60%). $^1$H NMR (500 MHz, CDCl$_3$), δ=8.07 (d, J=8.5 Hz, 12H, Ar-H), 7.65 (s, 6H, Ar-H), 7.65 (d,J=8.5 Hz, 12H, Ar-H), 7.51 (d, J=8.4 Hz, 12H, Ar-H), 7.25 (d, J=8.4 Hz, 12H, Ar-H), 5.75 (s, 2H, Csp$^3$-H), 3.93 (s, 18H, Ome). $^{13}$C NMR (125 MHz, CDCl$_3$), δ=167.10, 145.08, 144.49, 141.40, 138.11, 137.43, 130.66, 130.23, 129.00, 127.01, 126.92, 126.41, 53.36, 52.27. ESI-HRMS calcd for C$_{104}$H$_{74}$O$_{12}$Na [M+Na]$^+$, m/z=1537.5078 and 1537.5081.

Figure 12:
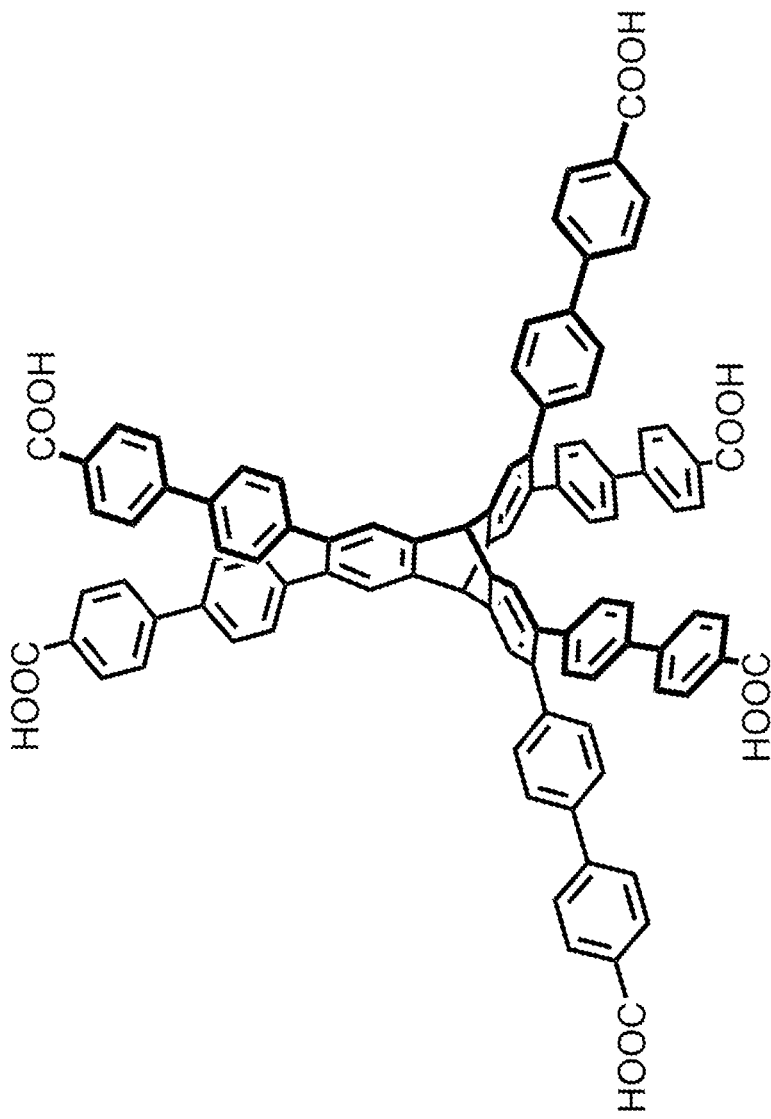
FIG. 12 shows the structure of PET-2.

Synthesis of PET-2 (FIG. 12)

Figure 11:
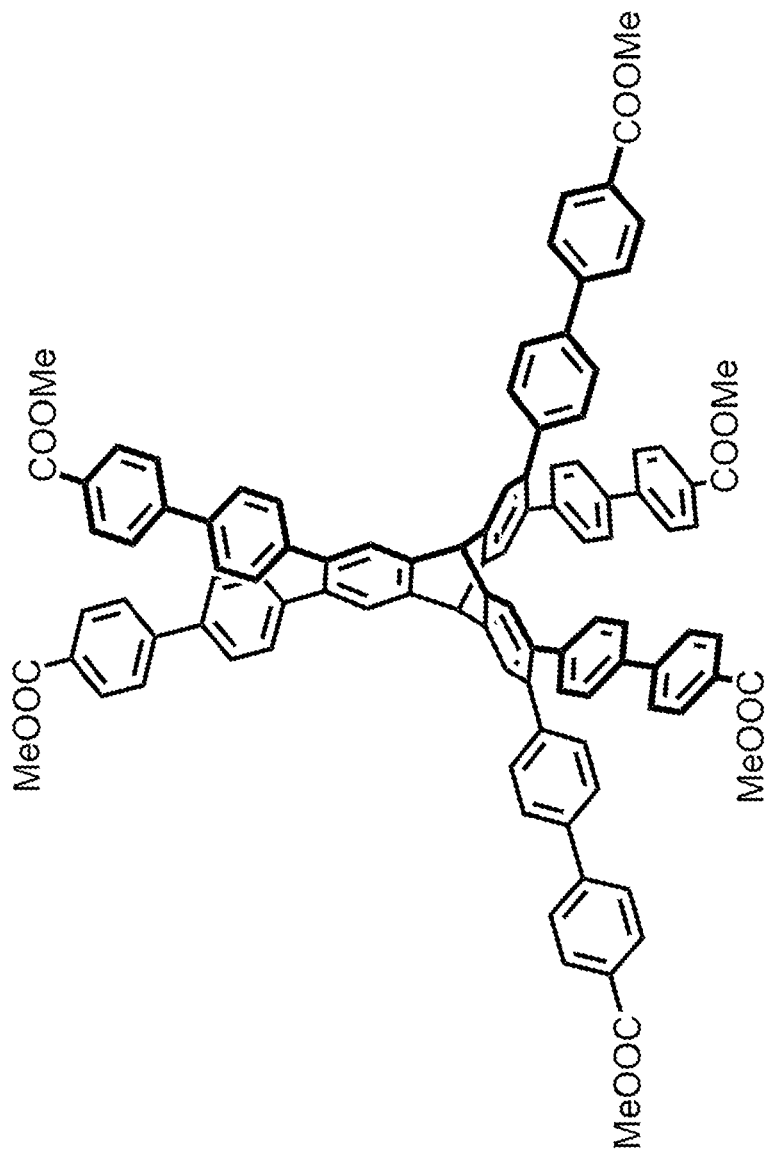
FIG. 11 shows the structure of $Me_6PET$-2.

Me$_6$PET-2 (FIG. 11) (2.66 g, 1.75 mmol) was dissolved in THF (50 mL) in a 250 mL round-bottomed flask equipped with a magnetic stirrer bar. Aqueous NaOH solution (1 M, 50 mL) was added and the resulting mixture was heated at 70° C. overnight. Upon cooling to room temperature, THF was removed under reduced pressure and the remaining aqueous solution was acidified (pH=1) with aqueous HCl solution (2 M). The resulting white precipitate was collected by filtration, washed with H$_2$O (20 mL) and dried under high vacuum to give the product as a white solid (2.29 g, 91%). $^1$H NMR (500 MHz, DMSO-d$_6$), δ=12.94 (s, 6H, O-H), 7.96 (d, J=8.1 Hz, 12H, Ar-H), 7.78 (d, J=8.1 Hz, 12H, Ar-H), 7.70 (s, 6H, Ar-H), 7.65 (d, J=8.1 Hz, 12H, Ar-H), 7.26 (d,J=8.1 Hz, 12H, Ar-H), 6.12 (s, 2H, Csp$^3$-H). $^{13}$C NMR (125 MHz, DMSO-d$_6$), δ=167.07, 144.59, 143.39, 141.01, 136.84, 136.40, 130.20, 129.84, 129.49, 126.49, 126.45, 126.23, 51.56. ESI-HRMS calcd for C$_{98}$H$_{62}$O$_{12}$Na [M+Na]$^+$, m/z=1453.4139, found 1453.4156.

Synthetic Protocols for PET-3

Figure 13:
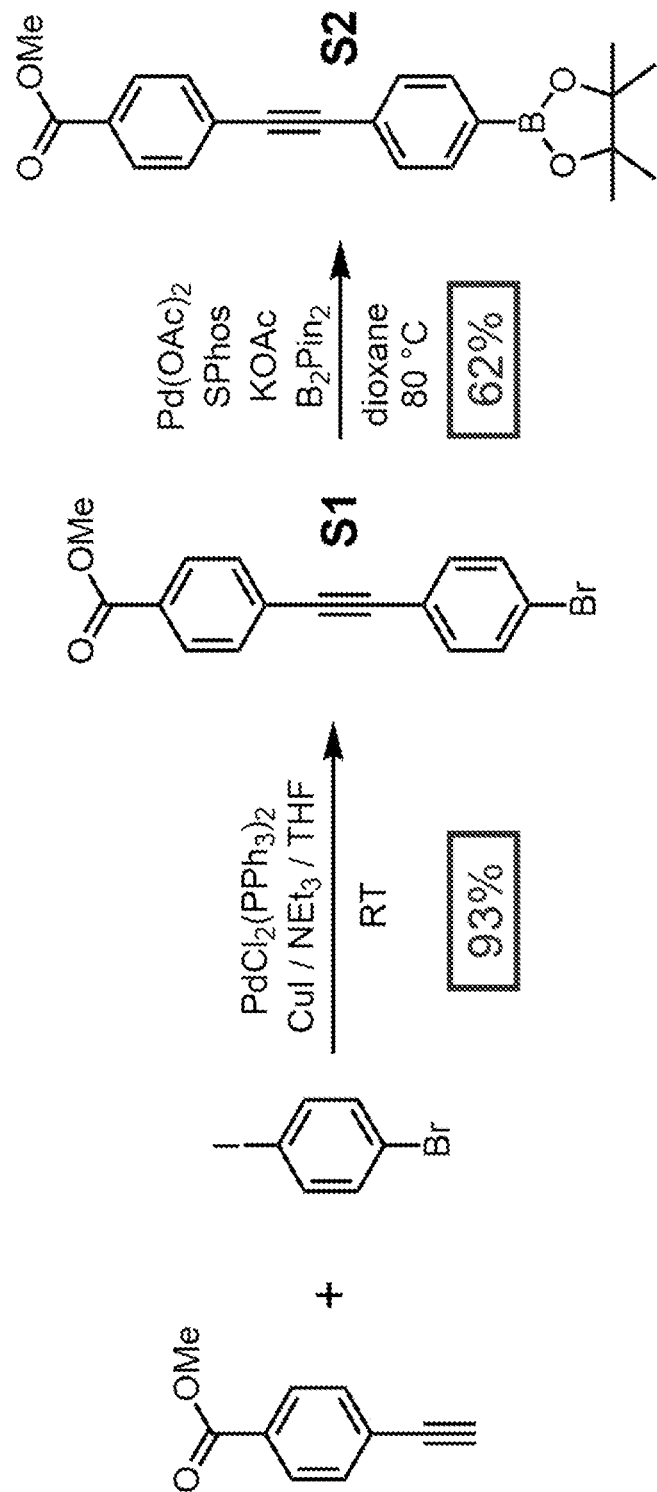
FIG. 13 shows the synthesis of key intermediates S1 and S2.

Synthesis of S1 (FIG. 13)

Methyl 4-ethynylbenzoate (16 g, 99.9 mmol), 1-bromo-4-iodobenzene (28.8 g, 101.9 mmol), PdCl2(PPh3)2 (0.7 g, 1 mmol) and CuI (0.38 g, 2 mmol) were added to a 500 mL round bottom flask equipped with a magnetic stirrer bar. The setup was evacuated and refilled with N$_2$ 5 times, at which point degassed THF (150 mL) and triethylamine (150 mL) were added. The reaction was kept stirring at room temperature for four days. Solvent was removed under reduced pressure. Water (500 mL) was added to the crude residue and the mixture was subjected to sonication for 30 min. Solid was collected via vacuum filtration and subsequently dispersed in a mixture solvent of CH$_2$Cl$_2$ (30 mL) and ethanol (300 mL). The suspension was kept stirring at room temperature overnight and filtered via vacuum filtration to give product as off-white powder (29.2 g, 93%). $^1$H NMR (500 MHz, CDCl$_3$), δ=8.03 (d, J=8.5 Hz, 2H, Ar-H), 7.58 (d, J=8.5 Hz, 2H, Ar-H), 7.51 (d, J=8.5 Hz, 2H, Ar-H), 7.40 (d, J=8.5 Hz, 2H, Ar-H), 3.93 (s, 3H, OMe). $^{13}$C NMR (125 MHz, CDCl$_3$), δ=166.64, 133.27, 131.89, 131.65, 129.87, 129.71, 127.75, 123.24, 121.82, 91.34, 89.85, 52.41.

Synthesis of S2 (FIG. 13)

Dia-Br (5.5 g, 17.5 mmol), SPhos (0.22 g, 0.53 mmo), KOAc (3.43 g, 34.9 mmol), B$_2$Pin$_2$ (5.32 g, 20.9 mmol), and Pd(OAc)$_2$ (0.12 g, 0.53 mmol) were added to a 100 mL round bottom flask equipped with a magnetic stirrer bar. The setup was evacuated and refilled with N$_2$ 5 times, at which point degassed anhydrous dioxane (150 mL) was added. The reaction was kept stirring at 80° C. overnight. The reaction, while hot, was filtered through a short plug of Celite. The filtration was concentrated, and residue was purified by chromatography (SiO$_2$, 100% CH$_2$Cl$_2$) to give the product as powder (3.89 g, 62%). $^1$H NMR (500 MHz, CDCl$_3$), δ=8.02 (d, J=8.5 Hz, 2H, Ar-H), 7.80 (d, J=8.1 Hz, 2H, Ar-H), 7.59 (d, J=8.5 Hz, 2H, Ar-H), 7.54 (d, J=8.1 Hz, 2H, Ar-H), 3.93 (s, 3H, OMe), 1.35 (s, 12H, Me). $^{13}$C NMR (125 MHz, CDCl$_3$), δ=166.68, 134.80, 131.70, 131.02, 129.72, 129.67, 128.03, 125.46, 92.62, 90.00, 84.16, 52.37, 25.03. ESI-HRMS calcd for C$_{22}$H$_{24}$BO$_4$ [M+H]$^+$, m/z=363.1768 and C$_{22}$H$_{23}$BNaO$_4$ [M+Na]$^+$, m/z=385.1587, found 363.1764 and 385.1584 respectively.

Figure 14:
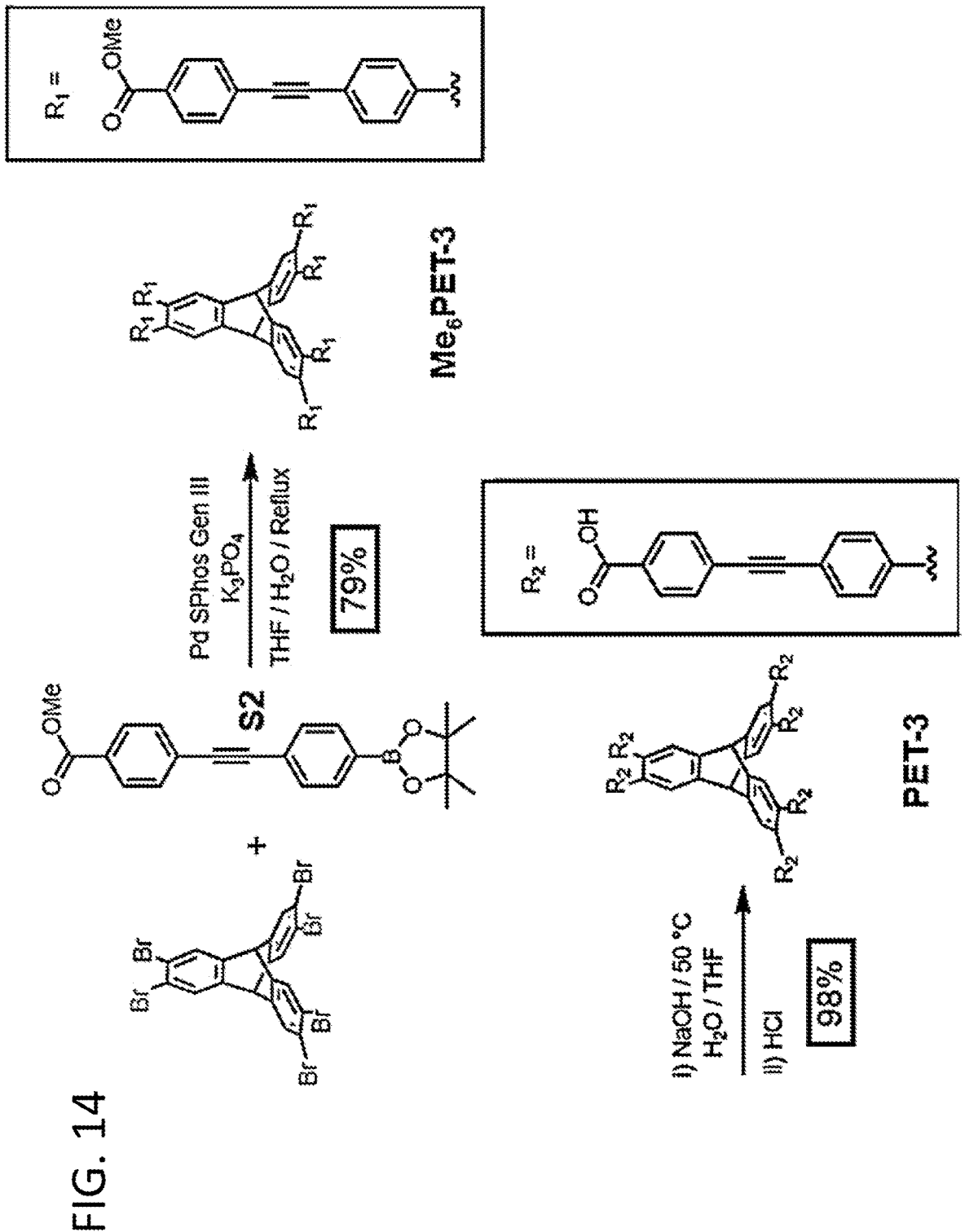
FIG. 14 shows the synthesis of PET-3.

Synthesis of Me$_6$PET-3 (FIG. 14)

Hexabromotriptycene (2.51 g, 3.45 mmol), Bpin (8 g, 22.1 mmol), Pd SPhos Gen III catalyst (0.22 g, 0.28 mmol) and THF (120 mL) were added to a 250 mL round-bottomed flask equipped with a magnetic stirrer bar. A condenser was attached to the flask and the mixture was degassed by bubbling N$_2$ for 30 min, at which point degassed aqueous K$_3$PO$_4$ solution (2 M, 40 mL) was added. The reaction was heated under reflux in an N$_2$ atmosphere overnight. After cooling to room temperature, the aqueous layer was removed by pipette. THF was removed under reduced pressure and the residue was dissolved in CH$_2$Cl$_2$ (200 mL). The solution was washed with saturated brine solution (100 mL) and dried (Mg$_2$SO$_4$). After removing the solvent, the crude solid was purified by chromatography (SiO$_2$, 0% to 5% EtOAc in CH$_2$Cl$_2$) to give the product as off-white powder (4.13 g, 79%). $^1$H NMR (600 MHz, CDCl$_3$), δ=8.01 (d, J=8.5 Hz, 12H, Ar-H), 7.59 (s, 6H, Ar-H), 7.56 (d, J=8.5 Hz, 12H, Ar-H), 7.40 (d, J=8.3 Hz, 12H, Ar-H), 7.10 (d, J=8.3 Hz, 12H, Ar-H), 5.72 (s, 2H, Csp$^3$-H), 3.92 (s, 18H, OMe). $^{13}$C NMR (125 MHz, CDCl$_3$), δ=166.66, 140.50, 141.71, 137.35, 131.64, 131.59, 130.14, 129.67, 129.64, 128.05, 126.21, 121.14, 92.35, 89.39, 53.26, 52.37. ESI-HRMS calcd for C$_{116}$H$_{74}$O$_{12}$Na [M+Na]$^+$, m/z=1681.5078, found 1681.5069.

Synthesis of PET-3 (FIG. 14)

Me$_6$PET-3 (1.59 g, 0.96 mmol) was dissolved in THF (30 mL) in a 100 mL round-bottomed flask equipped with a magnetic stirrer bar. Aqueous NaOH solution (1 M, 30 mL) was added and the resulting mixture was heated at 50° C. overnight. Upon cooling to room temperature, THF was removed under reduced pressure and the remaining aqueous solution was acidified (pH=1) with aqueous HCl solution (2 M). The resulting white precipitate was collected by filtration, washed with H$_2$O (20 mL), and dried under high vacuum to give the product as a white solid (1.48 g, 98%). $^1$H NMR (600 MHz, DMSO-d$_6$), δ=13.19 (s, 6H, O-H), 7.96 (d, J=8.2 Hz, 12H, Ar-H), 7.66 (s, 6H, Ar-H), 7.64 (d, J=8.2 Hz, 12H, Ar-H), 7.48 (d, J=7.9 Hz, 12H, Ar-H), 7.16 (d, J=7.9 Hz, 12H, Ar-H), 6.11 (s, 2H, Csp$^3$-H). $^{13}$C NMR (125 MHz, DMSO-d$_6$), δ=166.67, 144.69, 141.58, 136.29, 131.45, 131.33, 130.54, 129.94, 129.55, 126.56, 126.04, 120.06, 91.82, 89.13, 51.46. ESI-HRMS calcd for C$_{110}$H$_{62}$O$_{12}$Na [M+Na]$^+$, m/z=1597.4139, found 1597.4139.

Synthesis of MOFs

Synthesis of Single Crystals of NU-1600 (NU-1600-SC)

A DEF solution of PET-1 (1 mg, 0.5 mL) and a DEF solution of ZrCl$_4$ (2 mg, 0.5 mL) were combined in a 2-dram vial. Then, formic acid (1 mL) and TFA (100 μL) were added. The mixture was sonicated for 2 min and sealed and heated to 130° C. for 4 days and cooled to room temperature. Single crystals were formed and used for single crystal X-ray diffraction measurements.

Synthesis of Microcrystalline Powder Sample of NU-1600 (NU-1600-P)

PET-1 (30 mg, 0.031 mmol), ZrOCl$_2$·8H$_2$O (60 mg, 0.186 mmol), formic acid (4 mL, 105.7 mmol), and 4 mL of N,N-dimethylformamide (DMF) were ultrasonically combined in an 8-dram vial. The mixture was then sealed and heated to 120° C. for 18 h and cooled to room temperature. The polycrystalline powders were collected by centrifugation (7500 rpm for 5 min). As-synthesized samples were washed 6 times over 3 days with 12 mL of anhydrous DMF and then sequentially immersed in 12 mL of acetone for 3 days, during which time the acetone was replaced 2 times per day. The solids were then dried at 120° C. under vacuum on a Micromeritics Smart Vacprep for 12 h to yield activated samples (~33 mg).

Synthesis of Single Crystals of NU-1601 (NU-1601-SC)

A DMF solution of PET-2 (1 mg, 0.5 mL) and a DEF solution of ZrCl$_4$ (2 mg, 0.5 mL) were combined in a 2-dram vial. Then, formic acid (1 mL) was added. The mixture was then sonicated for 2 min and sealed and heated to 130° C. for 5 days and cooled to room temperature. Hexagonal block shaped single crystals were formed and used for single crystal X-ray diffraction measurements.

Synthesis of Microcrystalline Powder Sample of NU-1601 (NU-1601-P)

PET-2 (40 mg, 0.028 mmol), $ZrCl_4$ (80 mg, 0.343 mmol), formic acid (4 mL, 105.7 mmol), and DMF (10 mL) were ultrasonically combined in an 8-dram vial. The mixture was then sealed and heated to 120° C. for 24 h and cooled to room temperature. The polycrystalline powders were collected by centrifugation (7500 rpm for 5 min). As-synthesized samples were washed 6 times over 3 days with 12 mL of anhydrous DMF and then sequentially immersed in 12 mL of ethanol for 3 days, during which time the ethanol was replaced 2 times per day. The supercritical $CO_2$ activation was performed on the solids, and after that they were then dried at 120° C. under vacuum on a Micromeritics Smart Vacprep for 12 h to yield activated samples (~45 mg).

Synthesis of Single Crystals of NU-1602 (NU-1602-SC)

A DMF solution of PET-3 (1 mg, 0.5 mL) and a DEF solution of $ZrCl_4$ (2 mg, 0.5 mL) were combined in a 2-dram vial. Then, formic acid (0.5 mL) was added. The mixture was sonicated for 2 min and then sealed and heated to 130° C. for 4 days and cooled to room temperature. Hexagonal block shaped single crystals were formed and used for single crystal X-ray diffraction measurements.

Synthesis of Microcrystalline Powder Sample of NU-1602 (NU-1602-P)

PET-3 (40 mg, 0.025 mmol), $ZrCl_4$ (80 mg, 0.343 mmol), formic acid (4 mL, 105.7 mmol), and DMF (10 mL) were ultrasonically combined in an 8-dram vial. The mixture was then sealed and heated to 120° C. for 24 h and cooled to room temperature. The polycrystalline powders were collected by centrifugation (7500 rpm for 5 min). As-synthesized samples were washed 6 times over 3 days with 12 mL of anhydrous DMF and then sequentially immersed in 12 mL of ethanol for 3 days, during which time the ethanol was replaced 2 times per day. The supercritical $CO_2$ activation was performed on the solids, and after that they were then dried at 120° C. under vacuum on a Micromeritics Smart Vacprep for 12 h to yield activated samples (~44 mg).

Single Crystal X-ray Data

SCXRD data of NU-1600 and NU-1602 was collected at 100 K and 275 K, respectively, using a Bruker KAPPA APEX II (Bruker, Billerica, Mass.) equipped with an APEX2 CCD detector, Cryostream 80-400K (Oxford Cryosystems, Oxford, United Kingdom), and CuKα ($\lambda$=1.54178 A) IμS microfocus source with MX Optics and a Kappa geometry goniometer. The data of NU-1601 was collected at 275 K on a 'Bruker APEX-II CCD' diffractometer with a MoKα ($\lambda$=0.71073 A) microfocus X-ray source. The single crystals were mounted on MicroMesh (MiTeGen) with paratone oil. The structures were determined by intrinsic phasing (SHELXT 2018/2) and refined by full-matrix least-squares refinement (SHELXL-2018/3) using the Yadokari-XG software packages. (Sheldrick, G., SHELXT-Integrated space-group and crystal-structure determination. *Acta Cryst. A* 2015, 71, 3-8; Sheldrick, G. Crystal structure refinement with SHELXL. *Acta Cryst. C* 2015, 71, 3-8; Kabuto, C. et al., *J. Cryst. Soc. Jpn.* 2009, 51, 218-224.) The disordered non-coordinated solvents were removed using the PLATON SQUEEZE program. (Spek, A., *Acta Cryst. C* 2015, 71, 9-18.) The refinement results are summarized in Table 2. Crystallographic data for the NU-1600, NU-1601, NU-1602 crystal structures in CIF format have been deposited in the Cambridge Crystallographic Data Centre (CCDC) under deposition number CCDC-1908939-1908941. The data can be obtained free of charge via www.ccdc.cam.ac.uk/data_request/cif (or from the Cambridge Crystallographic Data Centre, 12 Union Road, Cambridge CB2 1EZ, U.K.).

Refinement Detail of NU-1600, NU-1601 and NU-1602

The inventors first attempted to solve the structure with the hexagonal cell, which indicated $Zr_{18}$ clustered MOF structure. However, the least-squares refinement of the crystal structure did not converge. The data should be interpreted as the twinning with reticular merohedry, and the observed $Zr_{18}$ cluster was refined as triple overlaps of $Zr_6$ cluster with different orientations (FIG. 4). By lowering the symmetry to monoclinic P and using PART command (PART 1, 2, 3), the twinning $Zr_{18}$-node structures were successfully divided into 3 components with the same occupancy (1/3). To survey the occupancies of the ligand part, a free variable was introduced for the occupancy refinements. For NU-1600, the occupancy of the ligand part was found to be 0.71, indicating the missing linker defects, while for NU-1601 and NU-1602, the calculated occupancies were 98~99%. Therefore, the occupancies of the ligand parts were set to 100% in the final refinements of NU-1601 and NU-1602. Some structural and thermal parameter restraints (DFIX, DANG, SADI, FLAT, RIGU, SIMU, ISOR) were used in the refinements. And thermal parameter constraint (EADP) on node oxygens on $Zr_6$ node was also used in the refinement.

Low-Pressure Sorption Measurements

Activation of NU-1600 was performed under a dynamic vacuum for 12 h on SVP at 120° C. (2° C./min). Supercritical $CO_2$ ($ScCO_2$) procedure was applied to activate NU-1601 and NU-1602. Before $ScCO_2$ drying, NU-1601 and NU-1602 were exchanged with DMF and then EtOH. During the 3-day period, the MOFs were washed with solvents 6 times. After $ScCO_2$ drying, activation of NU-1601 and NU-1602 was performed under a dynamic vacuum for 12 h on SVP at 120° C. (2° C./min). The pore size distributions of all MOFs in this Example were calculated based on the DFT model by using MicroActive Version 4.06.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A metal-organic framework comprising $M_6$ nodes connected by organic linkers, where M is a metal and the organic linkers comprise extended triptycene groups, the metal-organic framework having a 6,12-coordinated alb (aluminum diboride, hexagonal-prism and trigonal prism) network topology.

2. The metal-organic framework of claim 1, wherein M is zirconium.

3. The metal-organic framework of claim 1, wherein the metal-organic framework is a NU-1600 metal-organic framework, a NU-1601 metal-organic framework, or a NU-1602 metal-organic framework.

4. The metal-organic framework of claim 1, wherein M is hafnium, chromium, or thorium and the metal-organic framework is isostructural with a NU-1600 metal-organic framework, a NU-1601 metal-organic framework, or a NU-1602 metal-organic framework.

5. The metal-organic framework of claim 1, wherein the organic linkers comprise a central triptycene unit connected to peripheral groups comprising phenyl groups, diphenyl groups, or tolane groups.

6. A method of making a metal-organic framework comprising $M_6$ nodes connected by organic linkers, where M is a metal and the organic linkers comprise extended triptycene groups, the metal-organic framework having a 6,12-coordinated alb (aluminum diboride, hexagonal-prism and trigonal prism) network topology, the method comprising:
dissolving a metal salt, at least one peripherally extended triptycene ligand, and an acid in a solvent to form a solution; and
heating the solution to induce crystallization of the metal-organic framework from the metal salt and the peripherally extended triptycene ligand.

7. The method of claim 6, wherein the metal salt is a zirconium salt and the metal-organic framework is a zirconium metal-organic framework.

8. The method of claim 6, where in the metal salt is a hafnium salt and the metal-organic framework is a hafnium metal-organic framework.

9. The method of claim 6, wherein the metal salt is a cerium salt and the metal-organic framework is a cerium metal-organic framework.

10. The method of claim 6, wherein the metal salt is a thorium salt and the metal-organic framework is a thorium metal-organic framework.

11. A method of hydrolyzing a molecule, the method comprising exposing the molecule to a metal-organic framework having a 6,12-coordinated alb (aluminum diboride, hexagonal-prism and trigonal prism) network topology in the presence of water, the metal-organic framework comprising $M_6$ nodes connected by organic linkers, where M is a metal, the $M_6$ nodes have Lewis acidic sites, and the organic linkers comprise extended triptycene groups, wherein the metal-organic framework catalyzes the hydrolysis of a bond in the molecule.

12. The method of claim 11, wherein the hydrolysis of the bond takes place in the presence of a base.

13. The method of claim 12, wherein the molecule is an organophosphonate.

14. The method of claim 12, wherein M is zirconium.

15. The method of claim 12, wherein the metal-organic framework is a NU-1600 metal-organic framework, a NU-1601 metal-organic framework, or a NU-1602 metal-organic framework.

16. The method of claim 12, wherein M is hafnium, chromium, or thorium and the metal-organic framework is isostructural with a NU-1600 metal-organic framework, a NU-1601 metal-organic framework, or a NU-1602 metal-organic framework.

17. The method of claim 12, wherein the organic linkers comprise a central triptycene unit connected to peripheral groups comprising phenyl groups, diphenyl groups, or tolane groups.

\* \* \* \* \*